(12) United States Patent
Sardes et al.

(10) Patent No.: US 11,524,538 B2
(45) Date of Patent: Dec. 13, 2022

(54) WHEEL SUSPENSION AND TRANSMISSION GEAR ASSEMBLY

(71) Applicant: REE AUTOMOTIVE LTD, Glil-Yam (IL)

(72) Inventors: Ahishay Sardes, Tel Aviv (IL); Ran Dekel, Nofit (IL); Tomer Segev, Tel-Aviv (IL); Eran Starik, Tel Aviv-Jaffa (IL); Eylon Avigur, Ramat-Gan (IL)

(73) Assignee: REE AUTOMOTIVE LTD, Kibbutz Glil-Yam (IL)

( * ) Notice: Subject to any disclaimer, the term of this patent is extended or adjusted under 35 U.S.C. 154(b) by 0 days.

(21) Appl. No.: 17/318,601

(22) Filed: May 12, 2021

(65) Prior Publication Data

US 2021/0260947 A1 Aug. 26, 2021

Related U.S. Application Data

(63) Continuation-in-part of application No. 16/789,761, filed on Feb. 13, 2020, now Pat. No. 11,021,027, (Continued)

(51) Int. Cl.
*B60G 3/22* (2006.01)

(52) U.S. Cl.
CPC ............ *B60G 3/22* (2013.01); *B60G 2200/18* (2013.01); *B60G 2204/30* (2013.01)

(58) Field of Classification Search
CPC ... B60G 3/22; B60G 2200/18; B60G 2204/30
See application file for complete search history.

(56) References Cited

U.S. PATENT DOCUMENTS

| 429,331 A | 6/1890 | Wise |
| 1,283,083 A | 10/1918 | Coldwell |

(Continued)

FOREIGN PATENT DOCUMENTS

| CN | 1579822 | 2/2005 |
| DE | 102009059029 | 6/2011 |

(Continued)

OTHER PUBLICATIONS

European Search Report for Appl. No. 19830609.4 dated Feb. 16, 2022.

(Continued)

*Primary Examiner* — Drew J Brown
(74) *Attorney, Agent, or Firm* — Pearl Cohen Zedek Latzer Baratz LLP

(57) ABSTRACT

A wheel suspension and transmission gear assembly may include: a main arm pivotally connectable at a connection point of the main arm to a shaft point of a wheel; a first linkage unit pivotally connected at its first end to the main arm; and a second linkage unit pivotally connected at its first end to the main arm such that at least a portion of the main arm is between the first linkage unit and the second linkage unit and such that a second end of the first linkage unit and a second end of the second linkage unit are at opposing sides of the main arm with respect to each other; wherein (i) the main arm and (ii) the first linkage unit or the second linkage unit each may include: a first gear and a second gear pivotally connected thereto and interconnected to transmit rotational motion between each other.

25 Claims, 23 Drawing Sheets

Related U.S. Application Data which is a continuation of application No. 16/268,616, filed on Feb. 6, 2019, now Pat. No. 10,723,191, and a continuation-in-part of application No. 16/854,921, filed on Apr. 22, 2020, which is a continuation of application No. 16/265,166, filed on Feb. 1, 2019, now Pat. No. 10,801,853.

(60) Provisional application No. 62/692,787, filed on Jul. 1, 2018, provisional application No. 62/692,788, filed on Jul. 1, 2018.

(56) References Cited

U.S. PATENT DOCUMENTS

| | | | |
|---|---|---|---|
| 1,517,240 | A | 12/1924 | Alberson |
| 2,670,200 | A | 2/1954 | Seddon |
| 3,174,771 | A | 3/1965 | Müller |
| 3,191,452 | A | 6/1965 | Lipiski |
| 3,397,589 | A | 8/1968 | Graham |
| 3,426,610 | A | 2/1969 | Scharer |
| 3,578,354 | A | 5/1971 | Schott |
| 4,180,222 | A | 12/1979 | Thornberg |
| 4,353,677 | A | 10/1982 | Susnjara |
| 5,784,542 | A | 7/1998 | Ohm et al. |
| 6,105,710 | A | 8/2000 | Vandepitte |
| 7,009,350 | B1 | 3/2006 | Gold |
| 7,699,326 | B2 | 4/2010 | Yamada |
| 10,173,463 | B2 | 1/2019 | Barel |
| 10,723,191 | B1 | 7/2020 | Sardes |
| 10,801,583 | B2 * | 10/2020 | Sardes .................. B60G 5/04 |
| 2006/0012144 | A1 | 1/2006 | Kunzler et al. |
| 2008/0185807 | A1 | 8/2008 | Takenaka |
| 2011/0130212 | A1 | 6/2011 | Sholev |
| 2011/0209938 | A1 | 9/2011 | Basadzishvili |
| 2011/0260422 | A1 | 10/2011 | Kuttner et al. |
| 2012/0175857 | A1 | 7/2012 | Mathis |
| 2014/0251710 | A1 | 9/2014 | Juan |
| 2014/0300037 | A1 | 10/2014 | Winshtein et al. |
| 2015/0096823 | A1 | 4/2015 | Raymond |
| 2015/0191064 | A1 | 7/2015 | Gielisch |
| 2015/0211478 | A1 | 7/2015 | Dragic |
| 2016/0068016 | A1 | 3/2016 | Winshtein |
| 2017/0120748 | A1 | 5/2017 | Bandy |
| 2018/0072120 | A1 * | 3/2018 | Hunter .................. H02K 16/04 |
| 2019/0048976 | A1 | 2/2019 | Armstrong |
| 2019/0126740 | A1 | 5/2019 | Odaka |
| 2020/0112239 | A1 | 4/2020 | Hunter |
| 2020/0215866 | A1 | 7/2020 | Hoter Ishay |

FOREIGN PATENT DOCUMENTS

| | | |
|---|---|---|
| DE | 102013013324 | 2/2015 |
| DE | 10 2016 014004 | 5/2017 |
| EP | 2005030 | 12/2008 |
| FR | 1 273 251 | 10/1961 |
| FR | 2698825 | 6/1994 |
| GB | 1393187 | 7/1975 |
| GB | 2 247 063 | 2/1992 |
| IT | UB20 161 155 | 8/2017 |
| JP | S61-150607 U | 1/1987 |
| JP | 2007-062605 | 3/2007 |
| JP | 2013-525177 | 6/2013 |
| JP | 2016-049883 | 4/2016 |
| JP | 2017001417 | 1/2017 |
| WO | WO2007/114817 | 10/2007 |
| WO | WO2011/133258 | 10/2011 |

OTHER PUBLICATIONS

International Search Report of PCT Application No. PCT/IL2019/050724 dated Nov. 7, 2019.
Office Action of U.S. Appl. No. 16/265,166 dated Oct. 29, 2019.
Office Action for India Appl. No. 202117002459 dated Feb. 8, 2022.
Japanese Office Action for Appl. No. 2020-573523 dated May 31, 2022.
European Search Report for Appl. No. 19830188.9 dated Feb. 23, 2022.

* cited by examiner

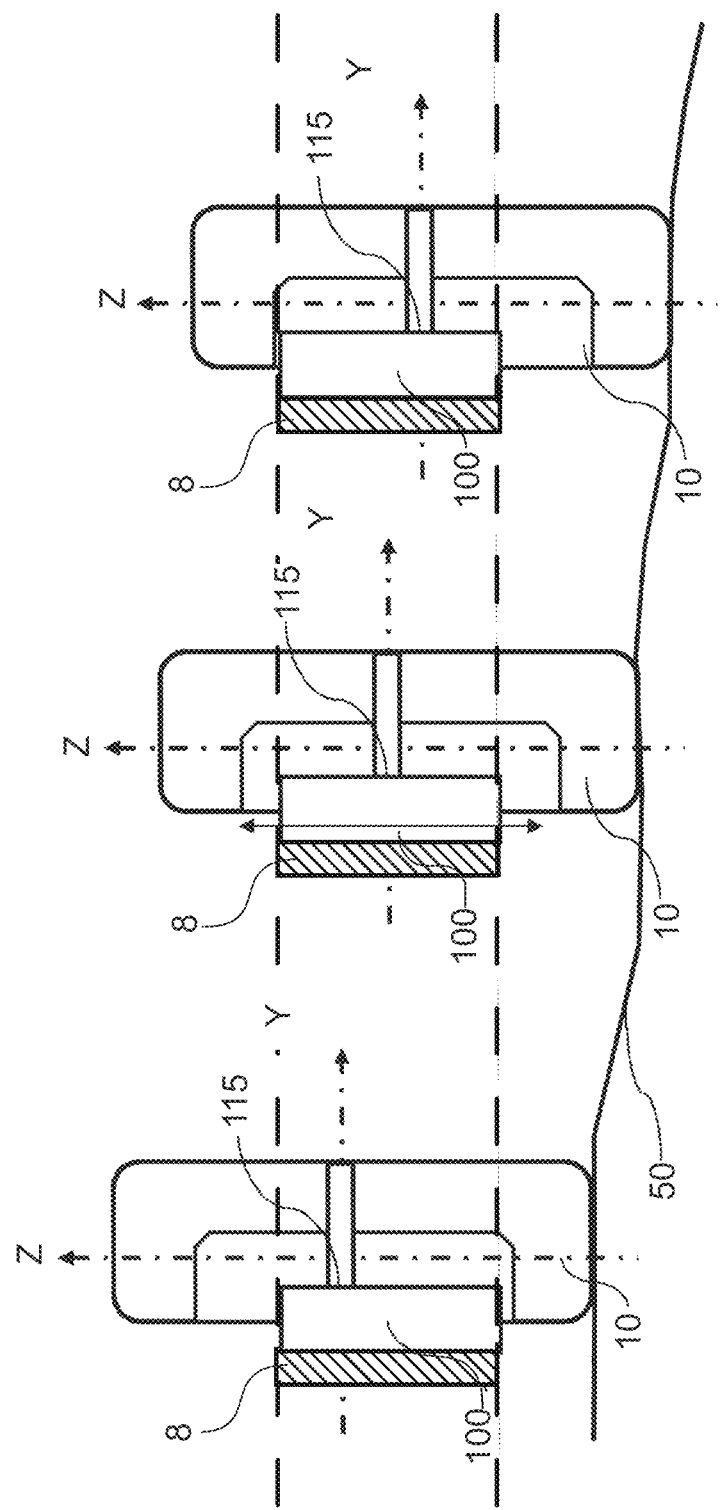

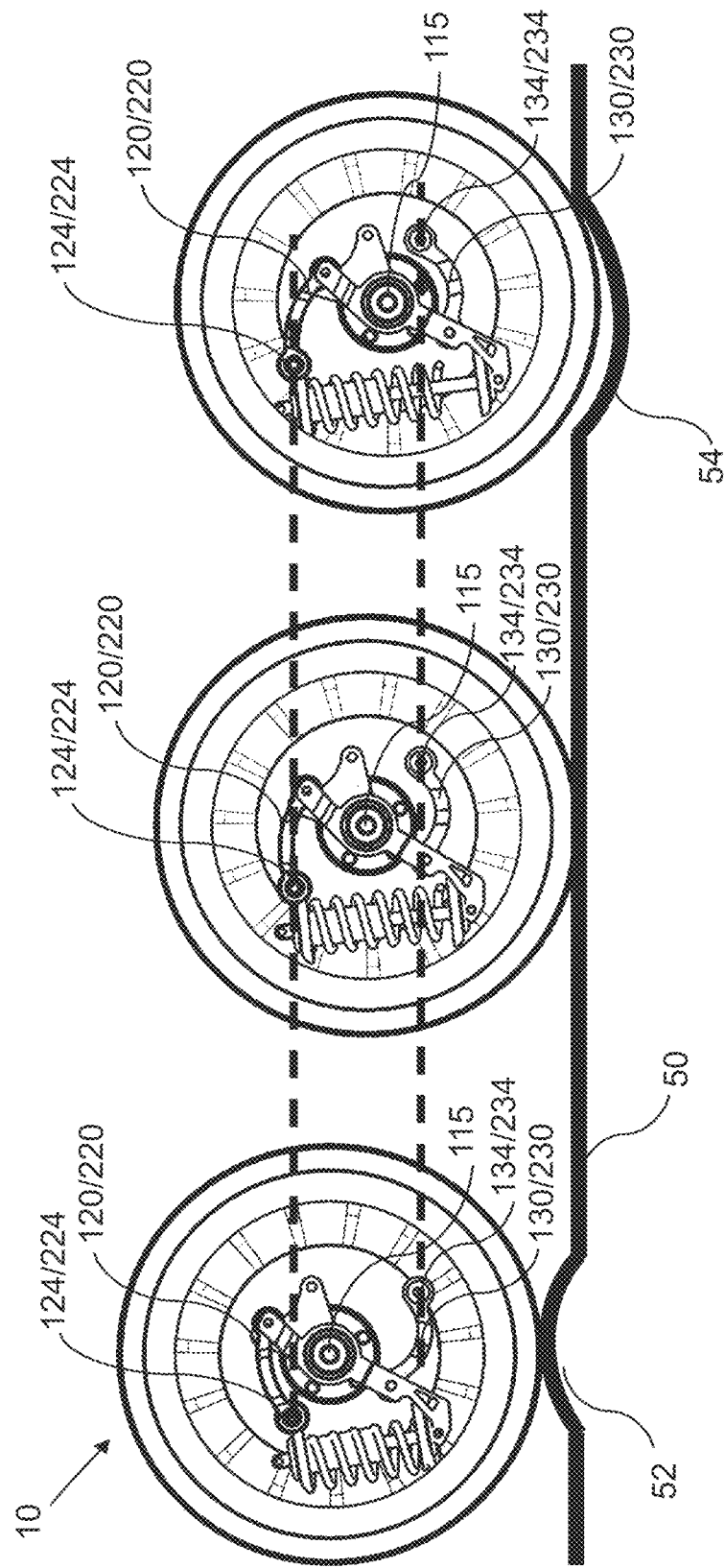

WHEEL SUSPENSION AND TRANSMISSION GEAR ASSEMBLY

CROSS REFERENCE TO RELATED APPLICATIONS

This application is a continuation in part of U.S. patent application Ser. No. 16/789,761 filed on Feb. 13, 2020, which in turn is a continuation application of U.S. patent application Ser. No. 16/268,616 filed on Feb. 6, 2019 and granted as U.S. Pat. No. 10,723,191 on Jul. 28, 2020, which claims the benefit of U.S. Provisional Patent Application No. 62/692,787 filed on Jul. 1, 2018, all of which are incorporated herein by reference in their entirety. This application is also a continuation in part of U.S. patent application Ser. No. 16/854,921 filed on Apr. 22, 2020, which is a continuation of U.S. patent application Ser. No. 16/265,166 filed on Feb. 1, 2019 and granted as U.S. Pat. No. 10,801,583 on Oct. 13, 2020, which claims the benefit of U.S. Provisional Patent Application No. 62/692,788 filed on Jul. 1, 2018, all of which are incorporated herein by reference in their entirety.

TECHNICAL FIELD OF THE INVENTION

The invention generally relates to suspension systems for vehicles, and more particularly to suspension and transmission systems for vehicles.

BACKGROUND OF THE INVENTION

Suspension systems are the systems configured to suspend a vehicle chassis above its wheels, to maintain good grip on the road while isolating the vehicle systems from road shocks and impacts. These can be contradicting demands that require compromising. Commonly used suspension systems, either rear or front, include: springs, shock absorbers and the linkages between to the vehicle's chassis and the wheels, all of which are external to the wheels.

In-wheel suspension systems have several advantages as well as challenges that must be overcome. Such suspension systems can reduce the weight of the vehicle and allow flexible damping of each wheel separately. There are several examples of in-wheel suspension systems which require complicated connections to the vehicles' chassis or the use of an expensive electrical suspension system in connection to an electrical motor. Such systems cannot be implemented to every vehicle.

Mechanical gears for transferring rotational power between an input shaft and one or more output shafts are usually used for one or more of the following purposes: setting a desired transfer ratio, changing the relative orientation, location and direction of the shaft between the spatial orientation of the input and the output axes (e.g., a 90-degrees helical gear), and/or providing power transmission having one direction of power transmission (e.g., 90 degrees helical gears). In all of these applications, the distance and orientation between the input shaft and the output shaft are fixed. There is need for gears that enable transferring power from an input shaft to an output shaft in a desired transfer ratio, in an efficient and immediate manner.

SUMMARY OF THE INVENTION

Some aspects of the invention are directed to an in-wheel suspension system that includes: an assembly that may include: a main arm pivotally connectable at a connection point (e.g., a midpoint) on the main arm to a shaft point of a wheel (e.g., included in: a hub-shaft of the wheel, a bearing of the wheel, an axle of the wheel, etc.), at least a first linkage unit pivotally connected at a first end to a first end of the main arm, and at least a second linkage unit pivotally connected at a first end to a second end of the main arm, wherein at least one second end of the first linkage unit and at least one second end of the second linkage unit, that are not connected to the main arm, may be pivotally connectable each to a reference frame at a defined distance between them, such as to form a substantially "Z" like shape.

In some embodiments, the assembly further includes at least a third linkage unit having a first end pivotally connected to the main arm at a defined location and a second end pivotally connected to the reference frame.

In some embodiments, least one of the first end and the second end of the third linkage unit may be pivotally connected via a spherical joint.

In some embodiments, least one of a first end of the first linkage unit pivotally connected at the first end of the main arm and a first end of the second linkage unit pivotally connected at the second end of the main arm are pivotally connected via a spherical joint.

In some embodiments, the at least one second end of the first linkage unit and at least one second end of the second linkage unit are connected so as to allow the respective unit to pivot axially around a first axis and a second axis respectively.

In some embodiments, the first axis and the second axis may be off parallel from each other.

In some embodiments, each linkage unit includes one or more linking elements and two or more pivoting connections.

In some embodiments, the one or more linking elements may be selected from the group consisting of: an arm, a rod, a lever and a shaft.

In some embodiments, the two or more pivoting connections are selected from the group consisting of: bearings, hinges and spherical joints.

In some embodiments, the assembly may be configured to restrict the movement of the connection point with respect to the second ends of the first and the second linkage units along a substantially straight line.

In some embodiments, the overall width of the assembly exceeds the depth of the inner rim of the wheel.

In some embodiments, overall width of the assembly may be at most the depth of the inner rim of the wheel.

In some embodiments, the suspension system further includes: a shock absorbing unit. In some embodiments, the shock absorbing unit may be connected to the assembly between two connection points configured to allow the shock absorbing unit to alter its length in response to change in the position of at least one of: the main arm and the first and second linkage units. In some embodiments, a rotary shock absorbing unit may be connected to one of the pivoted connections of at least one of: the main arms and the first and second linkage units. In some embodiments, the shock absorbing unit may be connected between one of: the first end of the main arm and the at least one second end of the second linkage unit.

In some embodiments, the shock absorbing unit may be selected from the group consisting of: a spring, mono-tube shock absorber, twin-tube shock absorber, Coilover shock absorber, a rotary damper, air shocks absorber, magnetic shocks absorber, energy harvesting shocks absorber and hydro-pneumatic shocks absorber.

In some embodiments, the reference frame may be one of: a chassis of the vehicle an element connectable to the chassis of the vehicle, an element connected to a conveyor, an element connected to a landing gear of an airplane and the like.

In some embodiments, the maximal allowable movement of the at least one second end of the first linkage unit or the at least one second end of the second linkage unit with respect to the connection point of the main arm may be less than a radius of an inner rim of the wheel.

In some embodiments, a wheel may be presented, including an inner rim and the in-wheel suspension system according to description above, assembled in the inner rim.

In some embodiments, a method of assembling the in-wheel suspension system according to description above in a vehicle is disclosed, including providing at least one in-wheel suspension assembly and a shock absorbing unit. In some embodiments, the shock absorbing unit may be connected to the assembly between two connection points configured to allow the shock absorbing unit to alter its length in response to change in the position of at least one of: the main arm and the first and second linkage units. In some embodiments, the shock absorbing unit may be connected to one of: the pivoted connections of the main arms and the first and second linkage units. In some embodiments, the method may further include placing the in-wheel suspension system inside an inner rim of the wheel, pivotally connecting a connection point (e.g., at the midpoint) of the main arm to a shaft point of the wheel (e.g., a point on the axis of: a hub shaft, a bearing, an shaft of the wheel, etc.), and pivotally connecting at least one second end of the at least one first linkage unit and at least one second end of the second linkage unit at a defined distance between them to a reference frame, such as to form a substantially "Z" like shape.

In some embodiments, the reference frame may be one of: a chassis of the vehicle and an element connectable to the chassis of the vehicle.

In some embodiments, the shock absorbing unit may be selected from the group consisting of: a spring, mono-tube shock absorber, twin-tube shock absorber, Coilover shock absorber, a rotary damper, air shocks absorber, magnetic shocks absorber, energy harvesting shocks absorber and hydro-pneumatic shocks absorber.

In some embodiments, the connection point with respect to the second ends of the first and the second linkage units may be restricted to move along a single substantially straight line.

In some embodiments, the maximal allowable movement of the at least one second end of the at least one first linkage unit or the at least one second end of the at least one second linkage with respect to the connection point of the main arm may be less than a radius of the inner rim of the wheel.

Some embodiments of the present invention may provide a wheel suspension and transmission gear assembly that may include: a main arm pivotally connectable at a connection point of the main arm to a shaft point of a wheel; a first linkage unit pivotally connected at its first end to the main arm; and a second linkage unit pivotally connected at its first end to the main arm such that at least a portion of the main arm is between the first linkage unit and the second linkage unit and such that a second end of the first linkage unit and a second end of the second linkage unit are at opposing sides of the main arm with respect to each other; wherein (i) the main arm and (ii) the first linkage unit or the second linkage unit each includes: a first gear and a second gear pivotally connected thereto and interconnected to transmit rotational motion between each other.

In some embodiments: the first gear of the first linkage unit or the second linkage unit is couplable to an input shaft being powered by a rotational power source, the first gear of the main arm is rotatable by the second gear of the first linkage unit or the second linkage unit, and the second gear of the main arm is couplable to an output shaft being coupled to the shaft point of the wheel.

In some embodiments, wherein the second gear of the first linkage unit or the second linkage unit and the first gear of the main arm rotate together about a common axis.

In some embodiments, wherein the gears of the main arm rotate in one plane, and the gears of the first linkage unit or the second linkage unit rotate in a different plane that is substantially parallel to the plane in which the gears of the main arm rotate.

In some embodiments, the first gear and the second gear of at least one of (i) the main arm and (ii) the first linkage unit or the second linkage unit, rotate in the same direction.

In some embodiments, at least one of (i) the main arm and (ii) the first linkage unit or the second linkage unit includes a drive belt or a drive chain interconnecting the respective first gear and the second gear.

In some embodiments, at least one of (i) the main arm and (ii) the first linkage unit or the second linkage unit includes an odd number of meshed gears to transmit rotation of the respective first gear to the respective second gear.

In some embodiments, the assembly further includes a shock absorbing unit.

In some embodiments, the shock absorbing unit is connected to at least one of the first linkage unit and the second linkage unit to cause the shock absorbing unit to alter its length in response to a change in a position of at least one of: the main arm, the first linkage unit and the second linkage unit.

In some embodiments, the connection point of the main arm to the shaft point moves along a straight line in response to a change in a position of at least one of: the main arm, the first linkage unit and the second linkage unit.

Some embodiments of the present invention may provide a wheel corner module that may include: a wheel suspension and transmission gear assembly, including: a main arm pivotally connectable at a connection point of the main arm to a shaft point of a wheel; a first linkage unit pivotally connected at its first end to the main arm; and a second linkage unit pivotally connected at its first end to the main arm such that at least a portion of the main arm is between the first linkage unit and the second linkage unit and such that a second end of the first linkage unit and a second end of the second linkage unit are at opposing sides of the main arm with respect to each other; wherein (i) the main arm and (ii) the first linkage unit or the second linkage unit each includes: a first gear and a second gear pivotally connected thereto and interconnected to transmit rotational motion between each other; and a drivetrain unit include: an input shaft coupled to the first gear of the first linkage unit or the second linkage unit; an output shaft coupled to the second gear of the main arm and couplable to the shaft point of the wheel; and a rotational power source coupled to the input shaft.

In some embodiments, the first gear of the main arm is rotatable by the second gear of the first linkage unit or the second linkage unit.

In some embodiments, the second gear of the first linkage unit or the second linkage unit and the first gear of the main arm rotate together about a common axis.

In some embodiments, the gears of the main arm rotate in one plane, and the gears of the first linkage unit or the second linkage unit rotate in a different plane that is substantially parallel to the plane in which the gears of the main arm rotate.

In some embodiments, the first gear and the second gear of at least one of (i) the main arm and (ii) the first linkage unit or the second linkage unit, rotate in the same direction.

In some embodiments, at least one of (i) the main arm and (ii) the first linkage unit or the second linkage unit includes a drive belt or a drive chain interconnecting the respective first gear and the second gear.

In some embodiments, at least one of (i) the main arm and (ii) the first linkage unit or the second linkage unit includes an odd number of meshed gears to transmit rotation of the respective first gear to the respective second gear.

In some embodiments, the wheel corner module includes a shock absorbing unit.

In some embodiments, the shock absorbing unit is connected to at least one of the first linkage unit and the second linkage unit to cause the shock absorbing unit to alter its length in response to a change in a position of at least one of: the main arm, the first linkage unit and the second linkage unit.

In some embodiments, the connection point of the main arm to the shaft point moves along a straight line in response to a change in a position of at least one of: the main arm, the first linkage unit and the second linkage unit.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1B is a schematic illustration an in-wheel suspension system assembled in a wheel at various poisons on the road according to some embodiments of the invention;

FIGS. 5A-5C are illustrations of the position of the arms of the in-wheel suspension system at 3 different positions of the wheel and the reference frame, according to some embodiments of the invention;

Figure 1A:
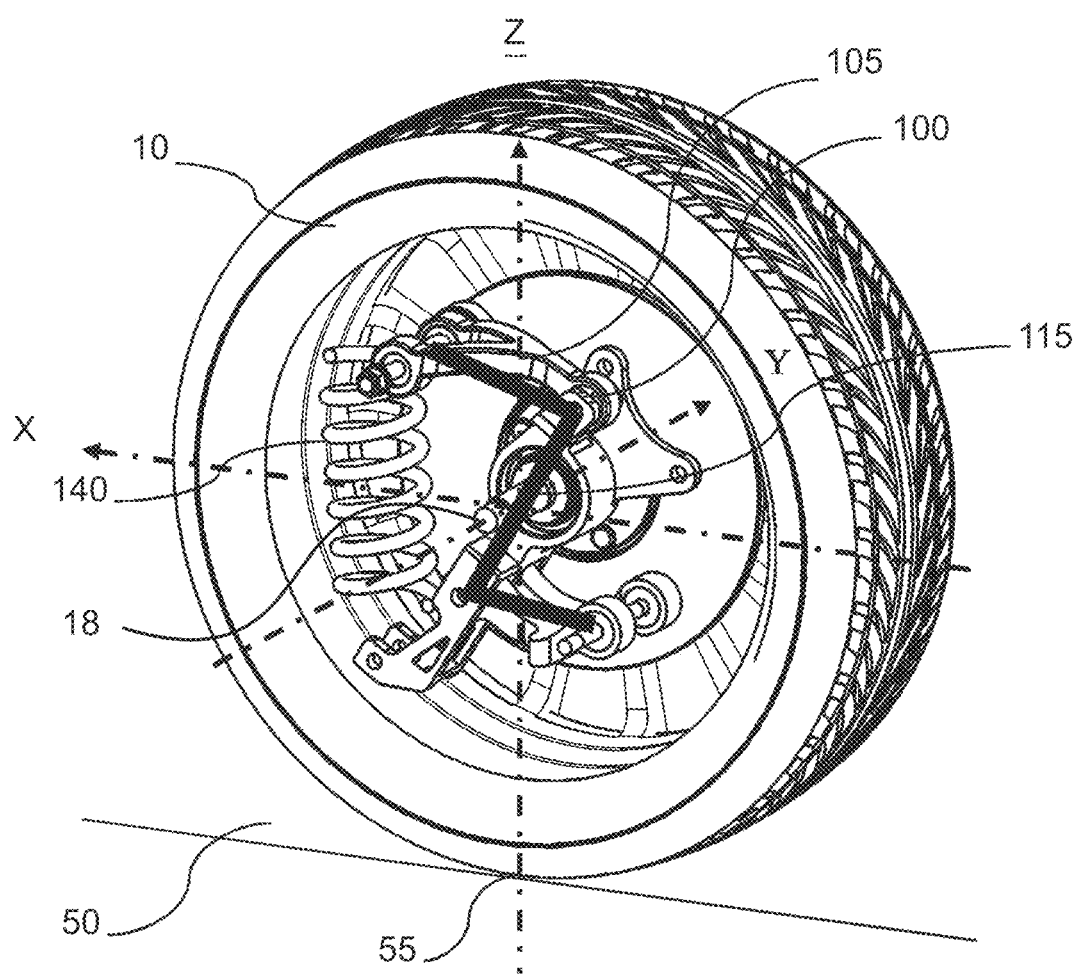
FIG. 1A is a schematic illustration of an in-wheel suspension system assembled in a wheel traveling on a road according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Some embodiments of the present invention may provide an in-wheel suspension system that may include three arms in a Watt's linkage configuration all been assembled inside an inner rim of a wheel. Such a suspension system may be compact, light-weight and may further allow the damping of each wheel separately, such that a bump or pothole in a road under one wheel may not affect at all any one of the other suspension systems of the other wheels. The in-wheel suspension system according to some embodiments of the invention may further include a shock absorbing unit for damping and absorbing shocks from the bumps or potholes in the road.

To better illustrate the general concepts of the invention, reference is now made to FIG. 1A, which is a schematic illustration of an in-wheel suspension system assembled in a wheel, for example, a wheel traveling on a road according to some embodiments of the invention. An in-wheel suspension system 100 may be assembled so it may be accommodated at least partially within a wheel 10 and may be connected to a reference frame 8 of the vehicle (e.g., the chassis) indicated as dashed lines. In-wheel suspension system 100 may include a suspension assembly 105 and a shock absorbing unit 140. Suspension assembly 105 may have, when assembled in wheel 10 and connected to a reference frame (e.g., the vehicle chassis), substantially a 'Z' like shape (as illustrated). The substantially a 'Z' like shape may relate to a straight 'Z' like shape and to a mirror image of a 'Z' like shape. The 'Z' like shape may be defined at a single plane (i.e., movements of its two parallel or near to parallel parts are in the same plane) or may have three-dimensional configuration (i.e., its two parallel or near to parallel parts may operate out of a common plane). Accordingly, any shape that includes a main arm connected at each of its ends to an additional arm (or units) such that the other ends of the two arms are pointing at substantially opposite directions—are in the scope of the invention.

The 'Z' like shape of assembly 105 may allow connection point 115 (e.g., the midpoint) to connect assembly 105 to a shaft point 18 of wheel 10 and to move in a substantially straight line, permitting upright movement in the direction of the Z axis in the drawing when wheel 10 is on road 50. In some embodiments, shaft point 18 of wheel 10 may be the axis of at least one of: hub shaft, a bearing, a shaft of the wheel 10, etc. The Z direction is defined by a line passing through point 55 at which wheel 10 touches road 50 and through connection point 115. Directions X and Y are orthogonal to direction Z, wherein direction X is the direction of the rolling of wheel 10. In some embodiments, connection point 115 may be located at the midpoint, thus substantially the same distance from road 50 regardless of the conditions, such as bumps or potholes in road 50, as illustrated in FIG. 1B, the 'Z' like shape of assembly 105 may allow connection point 115 to move, with respect to all the other elements of system 100, in a substantially straight line along the Z axis direction or any other direction. Thus, in some embodiments, when a chassis of the vehicle is connected to assembly 105 the chassis (and other system of the vehicle) may be allowed to move with respect to road 50, as will be illustrated and discussed in detail in FIGS. 5A-5B.

Reference is now made to FIGS. 2A-2D which are illustrations of in-wheel suspension assemblies according to some embodiments of the invention. A suspension assembly 105 may include a main arm 110 (also known in the art as an upright) pivotally connectable at a connecting point 115, 115' or 155" of main arm 110 to a shaft point 18 of wheel 10, which may be on the axis of a hub shaft 18, a wheel axle 18, or a bearing 18 of a wheel 10 (illustrated in details in FIGS. 3A-3B). As used herein, the term "pivotally connected" may refer to any pivoting connection, either a straight pivot (e.g., a bearing) or a spherical joint. Suspension assembly 105 may further include at least a first linkage unit 120 pivotally connected at a first end 122 to a first end of main arm 110 and at least a second linkage unit 130 pivotally connected at a first end 132 to a second end of main arm 110.

In some embodiments, the connection point may be positioned at the midpoint 115 of main arm 110. Connection point 115 may be located at even distances from the connections at first end 122 and first end 134. In some embodiments, other locations may be considered for the connection point, for example, asymmetrical connection points 115' and 115" located at different distances from first end 122 and first end 134. For example, an asymmetrical arrangement may allow suspension system 100 and a shock absorbing unit (e.g., shock absorbing unit 140 illustrated in FIGS. 3A-4B) to encounter a bump (e.g., when the wheel travels upwards relative to the chassis) while experiencing greater forces than when encountering a pothole. In some embodiments, an asymmetrical arrangement may include, different lengths for first linkage unit 120 and second linkage unit 130.

As should be understood by one skilled in the art, the connection point 115 illustrated at even distances from the connections at first end 122 and first end 134, in FIGS. 2-5, is given as an example only. In some embodiments, asymmetrical locations 115' and 115" may be considered as optional replacements to connection point 115.

In some embodiments, at least one second end 124 of first linkage unit 120 and at least one second end 134 of second linkage unit 130 that are not connected to main arm 110 may be pivotally connected each to a reference frame 8 (illustrated in FIG. 3B) at a defined distance between them, such as to form a substantially "Z" like shape. The substantially "Z" like shape may allow main arm 110 and at one first linkage unit 120 and at least one second linkage unit 130 to form and act as a Watt's linkage configuration.

As used herein, a substantially "Z" like shape may not necessarily be on a single plane but may have slightly three-dimensional movement, as long as the principle of the Watt's linkage configuration may be sustained. Therefore, in some embodiments, assembly 105 may be configured to restrict the movement of connection point 115 with respect to second ends 124 and 134 of the first and the second linkage units 120 and 130 along a substantially straight line.

Figure 2A:
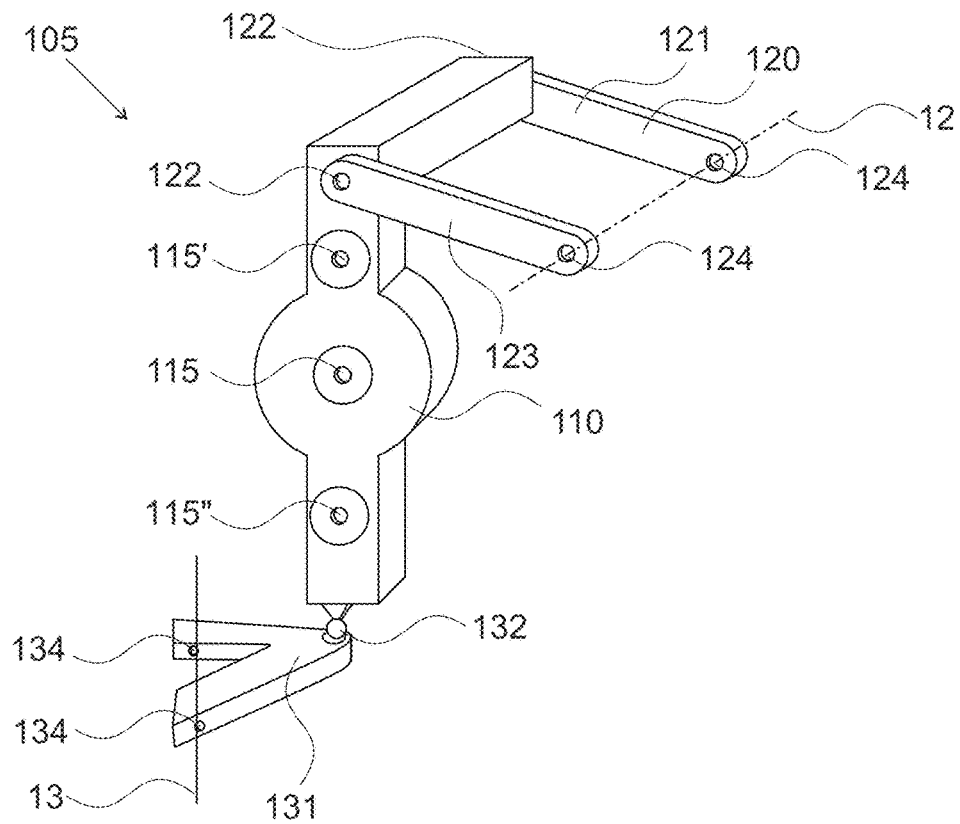
FIGS. 2A-2D are illustrations of in-wheel suspension assemblies according to some embodiments of the invention.
Figure 2B:
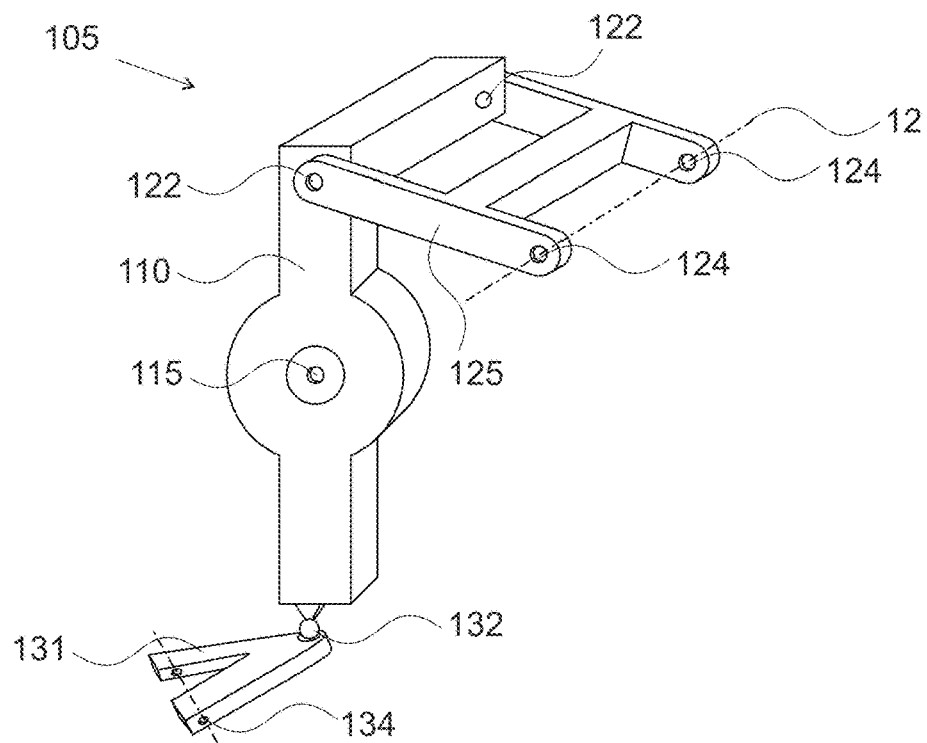
Figure 2C:
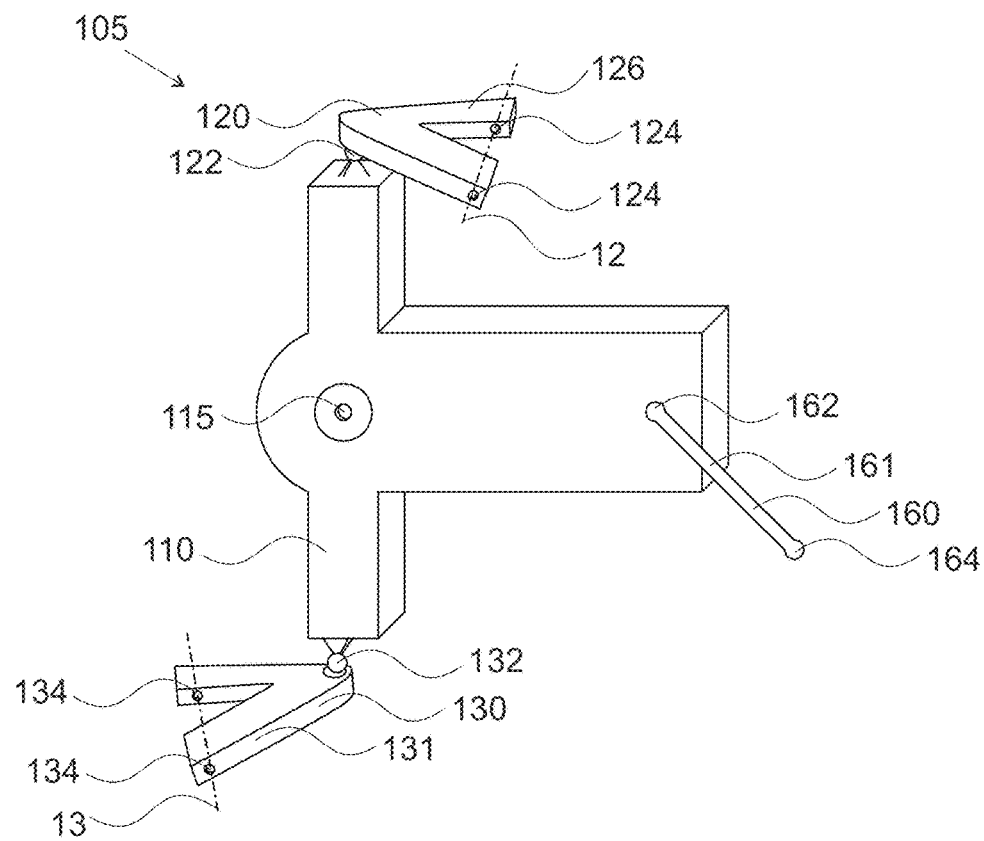
Figure 2D:
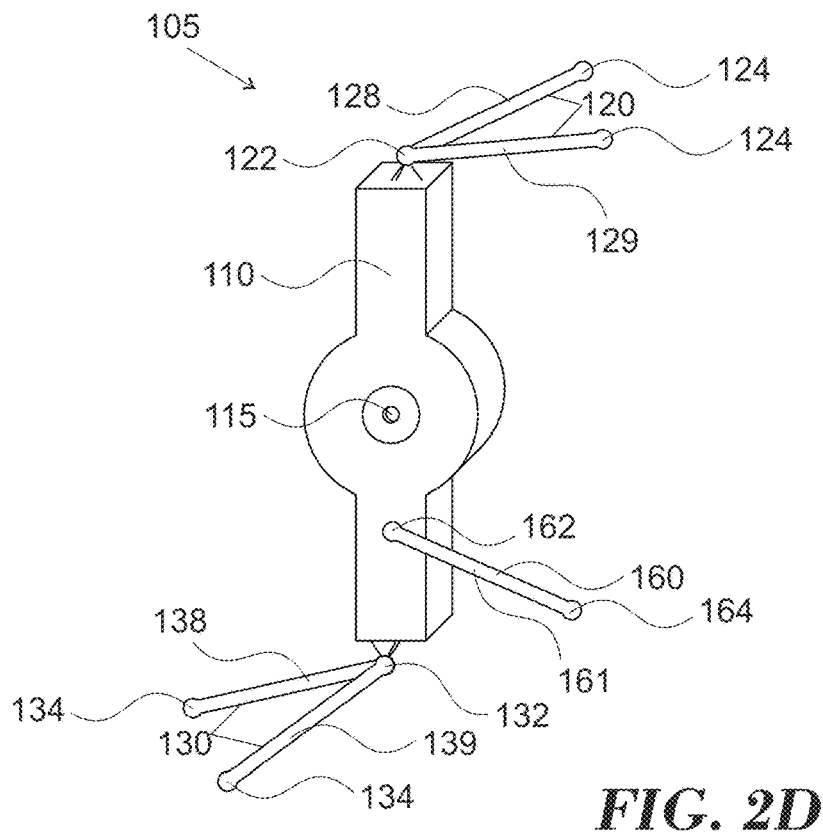

In some embodiments, assembly 105 may further include at least a third linkage unit 160, illustrated in FIGS. 2C and 2D. Third linkage unit 160 may have a first end 162 pivotally connected to main arm 110 at a defined location and a second end 164 pivotally connected to reference frame 8 (illustrated in FIG. 3B). In some embodiments, at least one of first end 162 and second end 164 of third linkage unit 160 may be pivotally connected via a spherical joint, as illustrated.

In some embodiments, each linkage unit 120, 130 or 160 may include one or more linking elements and two or more pivoting connections. A linking element according to embodiments of the invention may include any structural element that can be pivotally connected to main arm 110 and to reference frame 8 (illustrated in FIG. 4B). For example, linking element may include one or more arms, one or more rods, a lever, a shaft and/or a profile as illustrated in FIGS. 2A-2D. For example, first linkage unit 120, illustrated in FIG. 2A, may include two linking elements 121 and 123 (e.g., arms or rods), each being pivotally connected to main arm 110 at two first ends 122, and may further be connected to reference frame 8 at additional two second ends 124.

In another example, illustrated in FIG. 2B, first linkage unit 120 may include a single 'H' like linkage element 125 connected to main arm 110 at two first ends 122 and connected to reference frame 8 (illustrated in FIG. 4B) at additional two second ends 124. In some embodiments, 'H' like linkage element 125 may be pivotally connected to the main arm and/or farm 8 via two axles. In some embodiments, linkage element 125 may not include an 'H' like shape and may be defined merely by being connected via a single axle at each of its ends, a first axle in end 122 and a second axle in end 124. In some embodiments, the 'H' like linkage element 125 may be made from ridged profiles (as illustrated) or may include any other elements either rigidly or pivotally connected.

In yet another example illustrated in FIG. 2C, first linkage unit 120 may include a single 'V' like linkage element 126 connected to main arm 110 a single first ends 122 and may be connected to reference frame 8 at additional two second ends 124. In some embodiments, 'V' like linkage element 126 may be pivotally connected via a spherical joint at one end (e.g., end 122) and via one axle at the other end (e.g., end 124). In some embodiments, linkage element 126 may not include a 'V' like shape and may further be defined only by the two different pivot connections at its two ends.

Figure 4A:
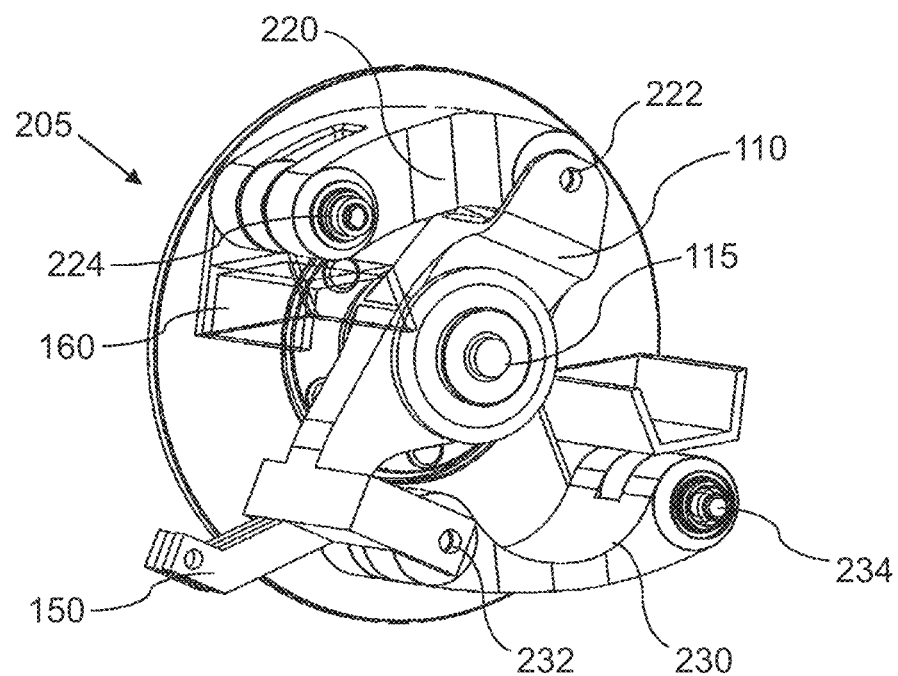
FIG. 4A is an illustration of an in-wheel suspension assembly according to some embodiments of the invention.
Figure 4B:
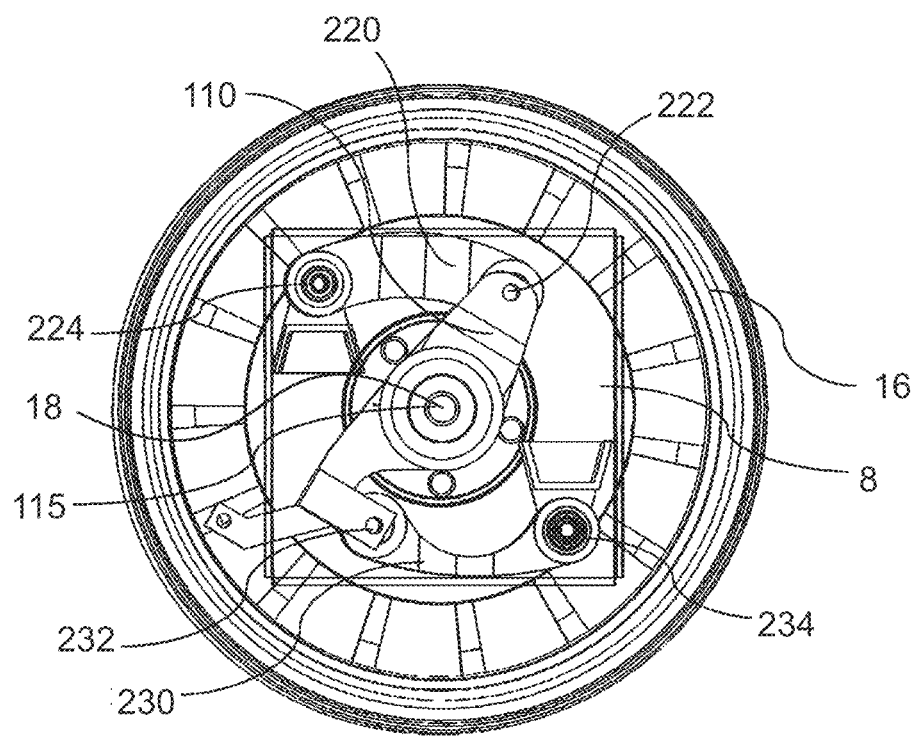
FIG. 4B is illustration of the in-wheel suspension system assembled inside an inner rim of a wheel and connected to a reference frame, according to some embodiments of the invention.

In a forth example illustrated in FIG. 2D first linkage unit 120 may include two linkage elements 128 and 129 each being a rod pivotally connected (e.g., via a spherical joint) at a first end 122 to main arm 110 and at two second ends 124 to a reference frame (e.g., frame 8 illustrated in FIG. 4B). Linkage unit 130 of FIG. 2D may include two linkage elements 138 and 139, each being a rod pivotally connected (e.g., via a spherical joint) at a first end 132 to main arm 110 and at two second ends 134 to a reference frame (e.g., farm 8 illustrated in FIG. 4B), and linkage unit 160 may include a single linkage elements 161 pivotally connected (e.g., via a spherical joint) to main arm 110 at a first end 162 and to the reference frame at second end 164.

In yet additional example, second linkage unit 130 may include a 'V' shaped linkage element 131 illustrated in FIGS. 2A-2C and configured to be connected to main arm 110 at single first ends 132 and may be connected to reference frame 8 (illustrated in FIG. 4B) at additional two second ends 134. In another example illustrated in FIG. 2D, second linkage unit 130 may include two linkage elements 138 and 139 each being a rod pivotally connected (e.g., via a spherical joint) at a first end 132 to main arm 110 and at two second ends 134 to a reference frame. In the embodiment illustrated in FIG. 2C, third linkage unit 160 may include a single linkage element 161 pivotally connected (e.g., via a spherical joint) to main arm 110 at a first end 162 and to the reference frame at second end 164. Additional examples of linkage units and linkage elements are given in FIGS. 3-4.

In some embodiments, pivoting connections to be include in linkage units, 120, 130 and/or 160 may include any connection that may allow pivoting around at least one axis. For example, the pivoting connections may include: bearings, bushings, hinges, spherical joints (e.g., ball joints, Heim joints, etc.) and the like. For example, at least one of first end 122 of first linkage unit 120 may be pivotally connected at the first end of main arm 110 via a spherical joint, as illustrated in FIGS. 2C and 2D. In some embodiments, first end 132 of second linkage unit 130 may be pivotally connected at second end of the main arm 110 via a spherical joint, as illustrated in FIGS. 2A-2D. In some embodiments, first end 122 of first linkage unit 120 and/or first end 132 of second linkage unit 130 may be connected via bearing, as illustrated in FIGS. 3-5.

In some embodiments, at least one second end 124 of first linkage unit 120 and at least one second end 134 of second linkage unit 130 may be connected so as to allow the respective unit to pivot axially around a first axis 12 and around a second axis 13 respectively, as illustrated in FIGS. 2A-2C and FIGS. 3-5. Such a connection may require the use of one or more bearing. In some embodiments, first axis 12 and second axis 13 may be off parallel from each other, as to allow a slight camber of wheel 10.

Figure 3A:
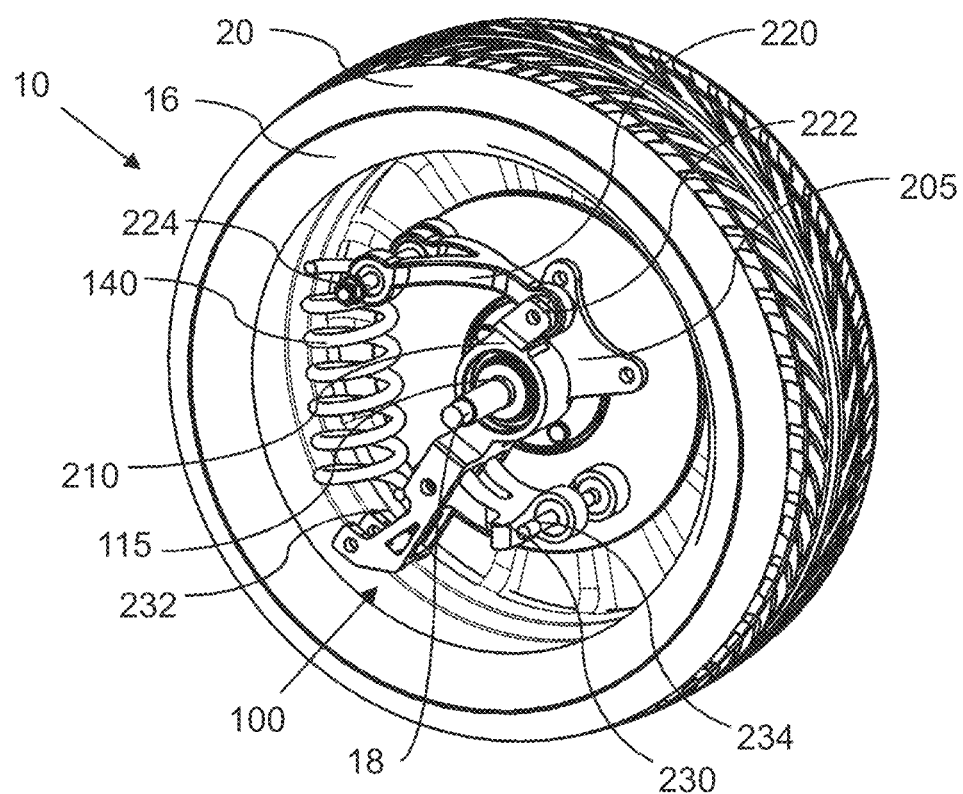
FIGS. 3A and 3B are illustrations of a wheel that includes in-wheel suspension system according to some embodiments of the invention.
Figure 3B:
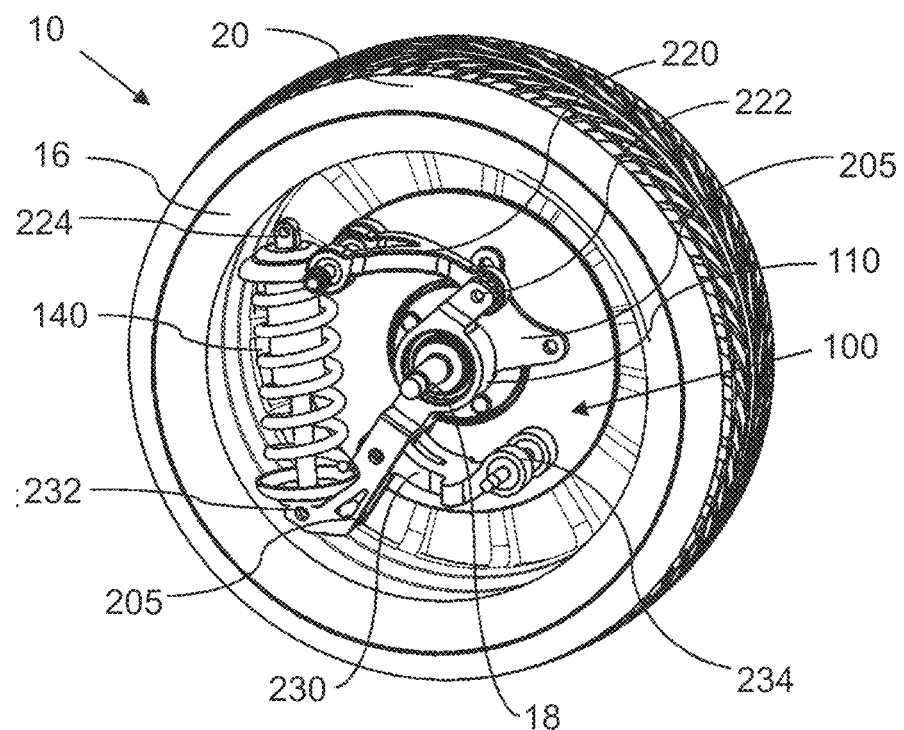

Reference is now made to FIGS. 3A-3B which are illustrations of an in-wheel suspension system assembled inside a vehicle's wheel according to some embodiments of the invention. An in-wheel suspension 100 may be assembled in a wheel 10 of a motorized vehicle or in a wheel 10 of a non-motorized vehicle. In-wheel suspension 100 may include an assembly 205 and a shock absorbing unit 140. Wheel 10 may include a tire 20, an inner rim 16 and a shaft point 18.

Assembly 105, illustrated in greater details in FIG. 4A, may include a main arm 110 (also known in the art as up-right arm) pivotally connectable at a connection point 115 of main arm 110 to shaft point 18 of wheel 10 (e.g., located on the axis of one of: a hub shaft, a bearing of wheel 10, an axle of the wheel 10, etc.), a first linkage unit 220 pivotally connected at a first end 222 to a first end of main arm 110 and a second linkage unit 230 pivotally connected at a first end 232 to a second end of main arm 110. In some embodiments, a second end 224 of first linkage unit 220 and a second end 234 of second linkage unit 230, not connected to main arm 110, may be pivotally connected to a reference frame, for example, a reference frame 8 (e.g., a chassis) illustrated in FIG. 4B. In some embodiments, second end 224 and second end 234 may be pivotally connected at a defined distance between them, such as to form a '7' like shape typical to the Watt's linkage configuration.

In some embodiments, connection point 115 of main arm 110 may be restricted to move with respect to second ends 224 of first linkage unit 120 and 234 of second linkage unit 130 along a single substantially straight line, as illustrated and discussed with respect to FIGS. 5A-5C. In some embodiments, at connection point 115, main arm 110 may include any designated bore for holding a bearing configured to bear the hub shaft of wheel 10. In some embodiments, at end 222 and 232, main arm 110 may include designated bores for holding bearings configured to bear pivots as to allow main arm 110 to be pivotally connected to first and the second linkage units 220 and 230. In some embodiments, the designated bores may each be configured to hold a first part of a spherical joint, which may allow the connections between main arm 110 and linkage units 220 and 230 to be pivoted around more than one axis, as disclosed and discussed above with respect to FIGS. 2A-2D.

Main arm 110 may have a profile and dimensions sufficient to sustain forces and stresses applied on main arm 110 from one of: the hub shaft, and/or bearings of wheel 10 and linkage units 220 and 230. Main arm 110 may further be loaded by a shock absorbing unit 140. Main arm 110 may be made from any suitable material, for example, various types of steel, and/or composite materials. For example, a main arm 110 for a passenger car weighing 1600 Kg having rim diameter of 17" may be configured to hold loads of 800 Kg. Such an arm 110 may have a 20 mm thinness profile.

First linkage unit 220 may include a first bore at end 222 for holding a bearing to allow a pivot to pivotally connect first linkage unit 220 to main arm 110. In some embodiments, the bore may hold a second part of a spherical joint to allow linkage unit 220 and main arm 110 to be pivoted around more than one axles. First linkage unit 220 may further include a second bore at end 224 for holding a bearing as to allow a pivot to pivotally connect first linkage unit 220 to reference frame 8 (illustrated in FIG. 4B) and shock absorbing unit 140.

First linkage unit 220 may include a single linkage element having a profile and dimensions sufficient to endure loads and forces applied by main arm 110 shock absorbing unit 140 and the chassis of the vehicle (illustrated in FIG. 4B).

Second linkage unit 230 may include a first bore at end 232 for holding a bearing to allow a pivot to pivotally connect second linkage unit 230 to main arm 110. In some embodiments, the bore may hold a second part of a spherical joint to allow linkage unit 230 and main arm 110 to be pivoted around more than one axle. First linkage unit 220 may further include a second bore at end 234 for holding a bearing to allow a pivot to pivotally connect second linkage unit 230 to reference frame 8 (illustrated in FIG. 4B).

Second linkage unit 230 may have a profile and dimensions sufficient to endure loads and forces applied by main arm 110 and chassis of the vehicle (illustrated in FIG. 4B).

In some embodiments, shock absorbing unit 140 may be any unit that can be assembled into assembly 105 that is configured to absorb, damp, reduce, etc., shocks applied to assembly 105 by external forces. Shock absorbing unit 140 may be a compacted unit that may allow the assembly of suspension system 100 in rim 16. In some embodiments, the shock absorbing unit may be connected to the assembly between two connection points configured to allow the shock absorbing unit to alter its length in response to a change in the position of at least one of: the main arm and the first and second linkage units. For example, such a leaner shock absorbing unit 140 may be connected at one end to one of: first linkage unit 120 and second linkage unit 130 and at the other end to be pivotally connected to the reference farm (e.g., farm 8 illustrated in FIG. 4B).

In some embodiments, shock absorbing unit 140 may be a rotary shock absorbing unit configured to rotate as a function of the wheel movement. In some embodiments, a rotary shock absorbing unit 140 may be connected to one of the pivoting connections of the main arms and the first and second linkage units, for examples, in ends 122/222, 124/224, 132/232 and/or 134/234. For example, shock absorbing unit 140 may be a rotary spring or a rotary damper.

Shock absorbing unit 140 may include any mechanical, hydraulic, magnetic, electrical, pneumatic devices or combination thereof that may be configured to absorb and dampen shock impulses, by converting the kinetic energy of the shock into heat, electrical current and/or magnetic flux. Shock absorbing unit 140 may include at least one of: a spring (illustrated in FIG. 1A), mono-tube shock absorber, twin-tube shock absorber, Coilover shock absorber (illustrated in FIG. 1B), a rotary damper, air shocks absorber, magnetic shocks absorber, energy harvesting shocks absorber and hydro-pneumatic shocks absorber and the like.

In some embodiments, assembly 205 may further include arm extension 250, illustrated in FIG. 4A, for extending the distance between end points 224 and 232 to increase the stroke of shock absorbing unit 140. In some embodiments, assembly 105 may further include one or more limits 260, also illustrated in FIG. 2A, for preventing end 132 from hitting end 224 and/or preventing end 222 from hitting end 234.

Reference is now made to FIG. 4B, which is an illustration of in-wheel suspension 100 assembled inside a rim 16 of wheel 10 and connected to reference frame 8, for example, connected to a chassis of a vehicle, according to some embodiments of the invention. In some embodiments, the maximal allowable movement of second end 124 or 224 of first linkage unit 120 or 220 or second end 134 or 234 of second linkage unit 130 or 230 with respect to connection point 115 of main arm 110 may be less than an inner radius of inner rim 16 of wheel 10. Such configuration may allow inner rim 16 to fully accommodate assembly 105 or 205 of in-wheel suspension 100. In some embodiments, the width of assembly 105 or 205 may be less than the depth of the inner rim of the wheel. In some embodiments, the overall width of assembly 105 or 205 may exceed the depth of inner rim 16 of wheel 10 as illustrated in FIG. 1B. In some embodiments, most of the width of assembly 105 or 205 may be accommodated inside inner space of rim 16 of wheel 10, as illustrated in FIG. 1A and FIGS. 3A-3B.

Reference is now made to FIGS. 5A-5C which are illustrations of the position of the arms of the in-wheel suspension at 3 different positions of the wheel and the chassis, according to some embodiments of the invention. The two dashed line presents the position of the vehicle's chassis when the vehicle is on a road 50. A discussed herein above, such an assembly may allow connection point 115 connected to shaft point 18 of the wheel 10, to move in substantially straight line and to form the Watt's linkage. Therefore, when wheel 10 hits road 50, regardless of the conditions of the road, the chassis (presented in dashed lines) is kept substantially at the same place and only linkage units 120/220 and 130/230 and shock absorbing unit 140 are configured to move. For example, when the wheel hits a bump 52 in road 50, as illustrated in FIG. 5A, end point 124/224 of linkage unit 120/220 apply force on shock absorbing unit 140, causing unit 140 to compress and absorb the impact from bump 52 and further allow connection point 115 (e.g., the midpoint) to move upwards while allowing the chassis to stay at substantially the same location with respect to road 50. In another examples, illustrated in FIG. 3B, assembly 105/205 is completely balanced on road 50 such that connection point 115 is located at the a-point determined by preload setting between end 124/224 and end 134/234 when the wheel is traveling on a flat road 50. However, when the wheel hits a pit 54 in road 50, illustrated in FIG. 5C, ends 124/224 and 134/234 are pushed upwards, shock absorbing unit 140 extends (e.g., while absorbing the shock) allowing connection point 115 to move downwards while allowing the chassis to stay at substantially the same location with respect to road 50.

As can be seen from FIGS. 5A-5C an in-wheel suspension system according embodiments of the invention may allow a vehicle to remain substantially balanced on the road regardless of the obstacle each wheel tackles separately, thus allowing much more comfortable ride to passengers in the vehicle.

As would be understood by one skilled in the art, the linkage units, the pivoting connections and the linkage elements illustrated and discussed with respect to FIGS. 2-5 are given as examples only, and the invention as a whole is not limited to these specific configurations.

Figure 6:
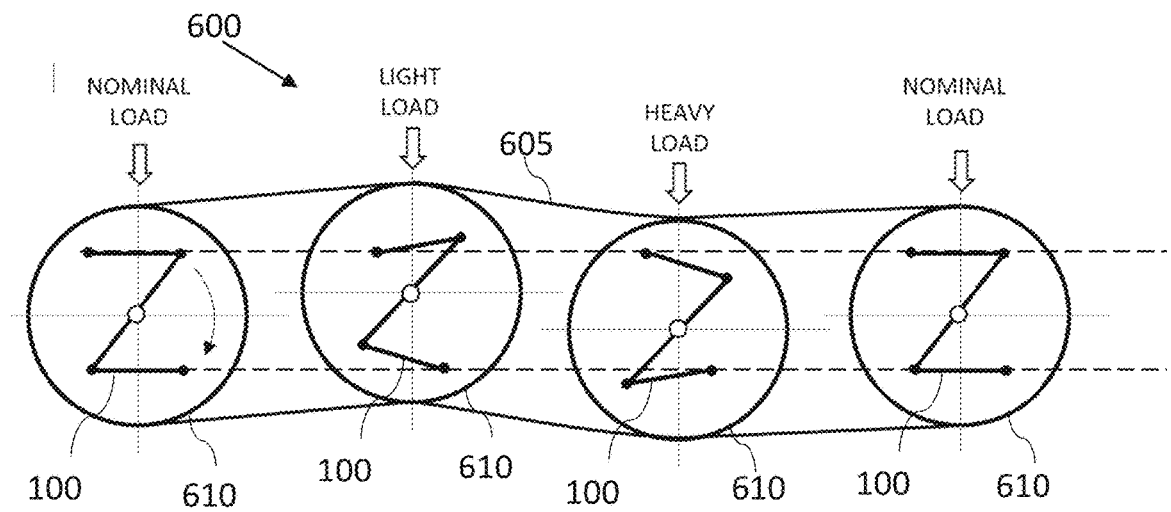
FIG. 6 is an illustration of an assembly of the in-wheel suspension system in a conveyor according to some embodiments of the invention.

Reference is now made to FIG. 6, which is an illustration of the in-wheel suspension system assembled in a conveyor according to some embodiments of the invention. A conveyor 600 may include a belt 605 and one or more wheels 610, each including in-wheel suspension system 100 according to some embodiments of the invention. In some embodiments, the assembled in-wheel suspension system 100 may allow damping shocks caused by various goods uploaded to conveyor 600, thus protecting the motor (not illustrated) and other drivetrain and structural parts of conveyor 600. In some embodiments, the uploaded goods may apply substantially a nominal load (e.g., the average load to which the conveyor were designed to carry) on conveyor 600. In such a case, suspension system 100 may absorb the load and may remain substantially at its nominal (e.g., center) position. In some embodiments, when conveyor 600 is loaded with loads either higher or lower than the nominal load, the main arm and linkage units of suspension system 100 may move to allow both shock absorbing and a movement compensation. In case of a load higher than the nominal load, suspension system 100 may be compressed, and in case of a load lower than the nominal load, suspension system 100 may be extended.

Figures 7A, 7B:
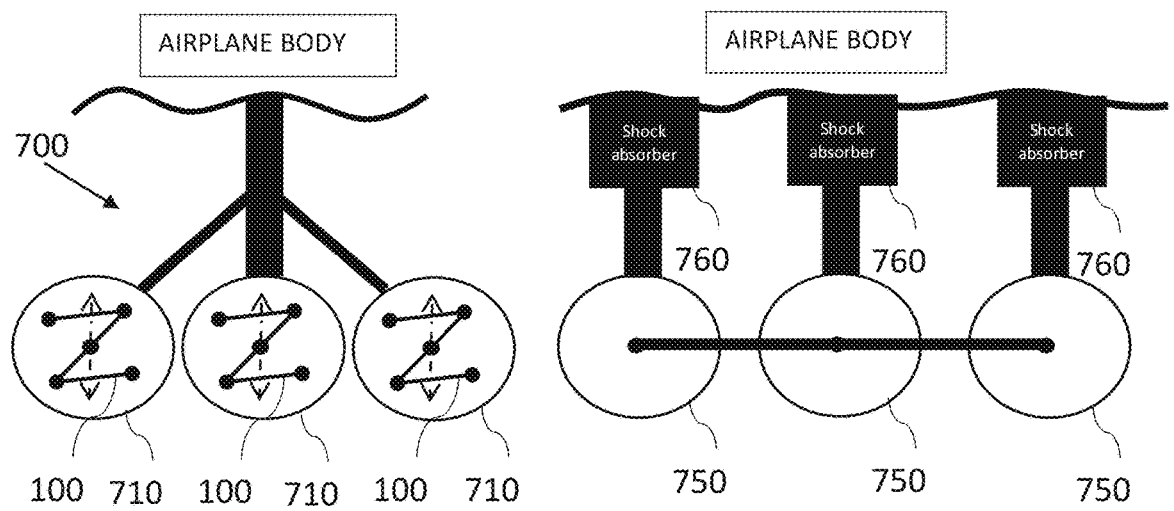
FIG. 7A is an illustration of an assembly of the in-wheel suspension system in an airplane's landing gear according to some embodiments of the invention.
FIG. 7B is an illustration of commonly used airplane's landing gear for comparison with the airplane landing gear of FIG. 7A.

Reference is now made to FIG. 7A, which is an illustration of an airplane landing gear according to some embodiments of the invention. A landing gear 700 may include two or more wheels 710, each including an in-wheel suspension system 100 according to some embodiments of the invention. In comparison, the commonly used landing gear illustrated in FIG. 7B includes two or more wheels 750 each being damped by an external shock absorber 760. Therefore, the commonly used landing gear has limited size for wheels 750, since room must be left for shock absorbers 760. Furthermore, all of wheels 750 are assembled to a single rigid chassis, which forces all the wheels to act together in response any obstacle.

In comparison, placing suspension system 100 inside wheel 710 may allow extending the diameter of wheels 710, thus allowing a better traction of wheels 710. In some embodiments, placing suspension system 100 inside wheel 710 may allow saving of the total volume consumed by landing gear 700. Furthermore, landing gear 700 may allow each one of wheels 710 to tackle an obstacle separately, thus providing better sock absorbing to the airplane.

In some embodiments, in-wheel suspension system 100 may be assembled in other mechanical or machinery systems, and reference frame 8 may be included in or connected to such mechanical or machinery systems. In some embodiments, when a motorized industrial system includes a narrow footprint of a rotating shaft which requires a predictable dynamic response, an in-wheel suspension 100 according to some embodiments of the invention may provide the necessary solution. For example, suspension 100 may be implemented to various textile machines, mechanical presses, industrial printers and the like. As should be understood by one skilled in the art, the vehicle, the conveyor and the airplane landing gear are given as examples only.

Figure 8:
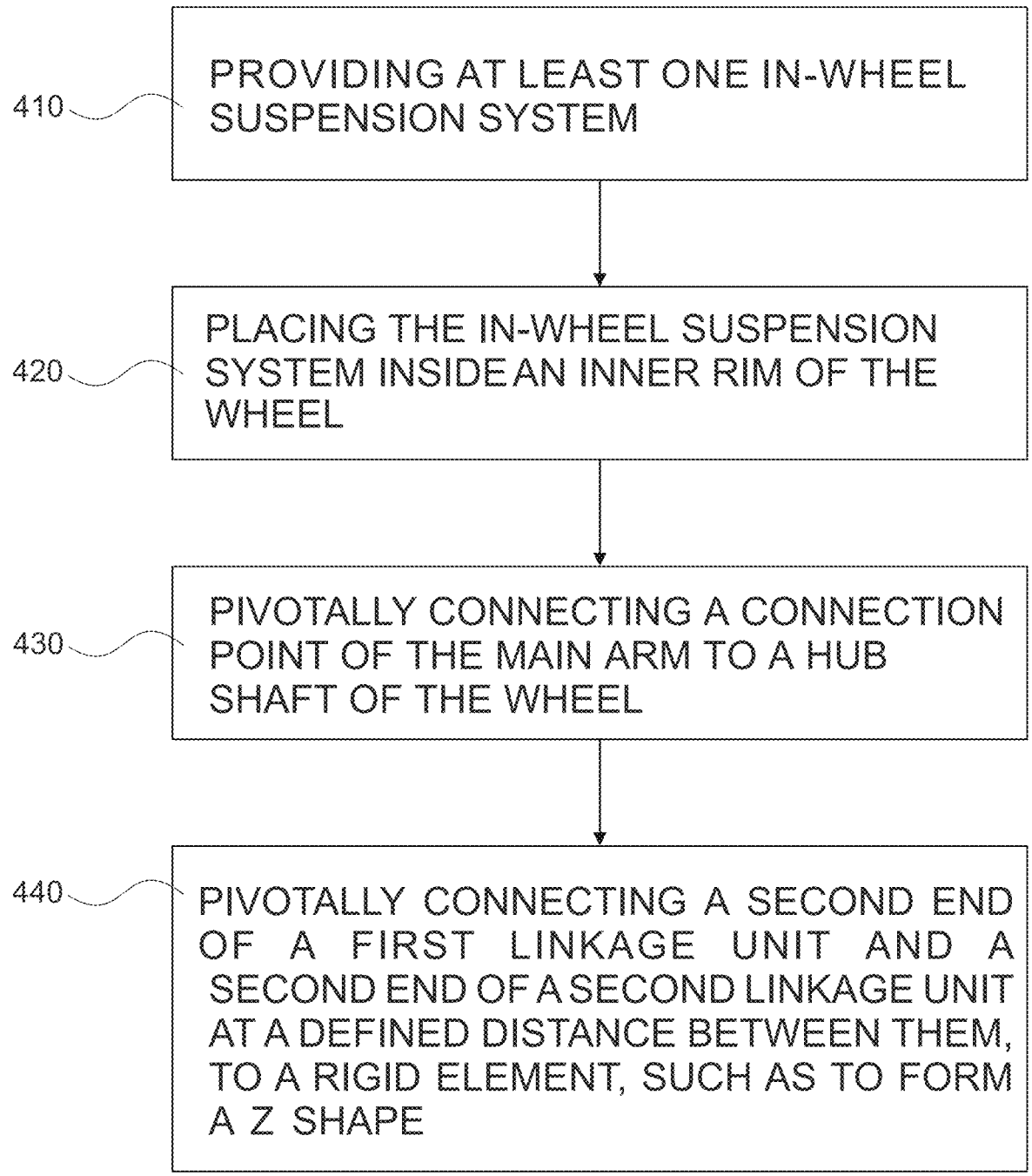
FIG. 8 is a flowchart of a method of assembling an in-wheel suspension system in a vehicle or a mechanical system according to some embodiments of the invention.

Reference is now made to FIG. 8, which is a flowchart of a method of assembling an in-wheel suspension in a vehicle or other mechanical system according to some embodiments of the invention. In box 410, at least one in-wheel suspension systems may be provided, for example, one of in-wheels suspension systems 100 illustrated in FIGS. 1-5. In some embodiments, a first pair of in-wheels suspension systems 100 may be provided to be assembled to the front wheels of the vehicle, and/or a second pair of in-wheels suspension systems 100 may be provided to be assembled to the rear wheels of the vehicle.

In box 420, the in-wheel suspension may be placed inside an inner rim of the wheel. For example, in-wheel suspension system 100 may be placed inside inner-rim 16, as illustrated in FIGS. 1A, 1B, 3A, 3B, 4A and 5A-5C. In box 430, a connection point of the main arm may be pivotally connected to a shaft point of the wheel. For example, midpoint 115 may include a bore and a bearing to be pivotally connected shaft point 18 of wheel 10.

In box 440, a second end of the first linkage unit and the second end of the second linkage unit may be pivotally connected at a defined distance between them to a reference frame (e.g., reference frame 8) such as to form a substantially 'Z' like shape. For example, second end 124 of first linkage unit 120 and second end 134 of second linkage unit 130 may be connected at a predefined distance to reference frame 8, which may be, for example, the chassis of the vehicle or an element connectable to the chassis of the vehicle. In some embodiments, reference frame 8 may be included in any mechanical system, such as conveyor 600 and landing gear 700 illustrated in FIGS. 6-7. Such a connection may form a Watt's linkage that includes main arm 110, first linkage unit 120 and second linkage unit 130, as to allow the movement of connection point 115 to be restricted with respect to the second ends of the first and the second linkage units (e.g., ends 124 and 134) along a single substantially straight line (e.g., the normal to the road, when the vehicle is on the road). In some embodiments, when assembled inside the inner rim, the maximal allowable movement of the second end of the first linkage unit or the second end of the second linkage unit with respect to the connection point of the main arm may be less than a radius of the inner rim of the wheel.

Some embodiments of the present invention may provide a multi-link transmission gear for transmitting rotational power from an input shaft to an output shaft. According to some embodiments of the invention, in order to, for example, enable movement of an output shaft with respect to an input shaft, two or more links in a multi-link articulated gear (MLAG) may be pivotally connected to each other, each link may include at least two gears interconnected with each other. It is noted that, throughout the description of embodiments of this invention, the term "link" or "link of MLAG" (hereinafter L-MLAG) can refer to a mechanical joint that fixedly connects two rotation axes to one another so that the axes are parallel to each other and are distanced so that gears that are rotating about the axes may drive (i.e., rotate) each-other, for example in the form of meshed gears, in the form of chain drive, in the form of drive belt, hydraulic, magnetic, and/or other power transference mechanisms as are known in the art. At least one axis of the link (L-MLAG) may serve also as a pivot enabling one L-MLAG to rotate (or swivel) about the at least one axis, thereby changing a relative angle between the lines in each L-MLAG that connect two adjacent axes. In some embodiments, two neighbor L-MLAGs re pivoted as described above so that, the gears of one L-MLAG are disposed in a plane different from that of the neighbor L-MLAG. In some embodiments described hereinbelow, rotation movement originating by a gear in one L-MLAG is transferred to a neighbor gear in the neighbor L-MLAG, which then its rotation is transferred to the other gear in the same L-MLAG.

Each L-MLAG may include a supporting structure and two or more gears. The supporting structure may support, e.g., by means of pivots (or axes) each of the gears and/or allow them to freely rotate while geared with each other. Each two neighboring L-MLAGs can share a common axis that can function both as rotation axis for a common gear and/or as an axis for changing the relative angle between the two neighboring L-MLAGs.

Figure 9A:
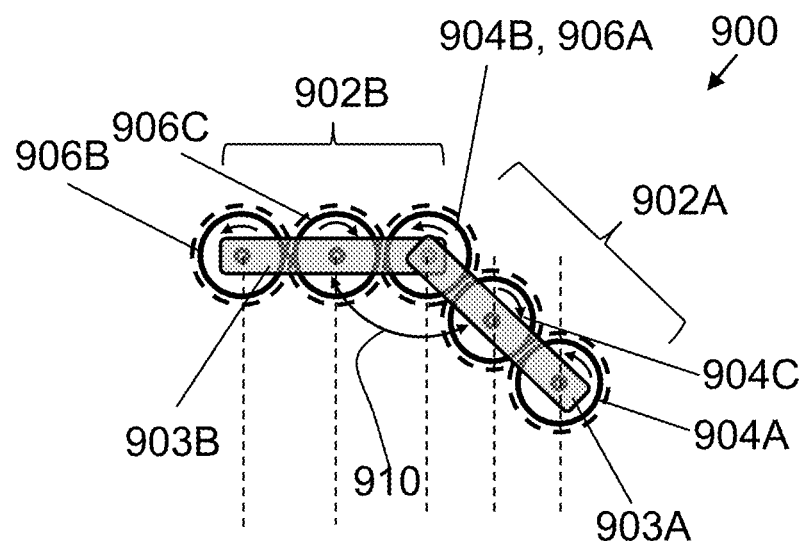
FIGS. 9A and 9B are schematic illustrations of multi-link articulated gearbox (MLAG) with two articulated links (L-MLAGs), according to some embodiments of the present invention.
Figure 9B:
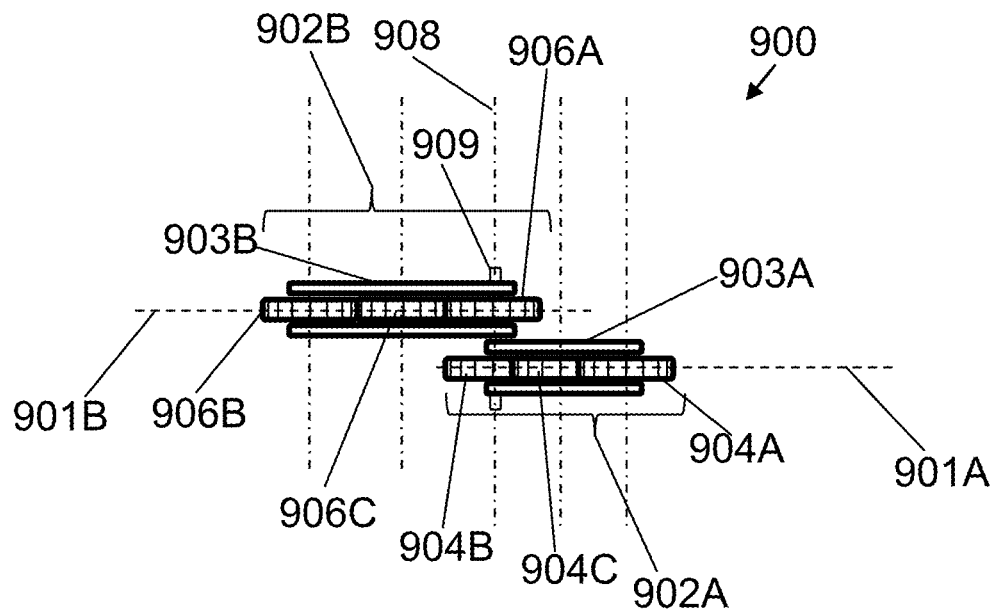

Reference is made to FIGS. 9A and 9B, which are schematic illustrations of multi-link articulated gearbox (MLAG) 900 with two articulated links (L-MLAGs), according to some embodiments of the present invention.

FIG. 9A shows a schematic side view of MLAG 900 and FIG. 9B shows a schematic top view of MLAG 900.

According to some embodiments of the invention, MLAG 900 includes a first L-MLAG 902A and second L-MLAG 902B.

First L-MLAG 902A may include a first support 903A. First L-MLAG 902A may include a first gear 904A, a second gear 904B. First gear 904A and second gear 904B of first L-MLAG 902A may be interconnected to transmit rotational motion between each other. In some embodiments, first L-MLAG 902A includes a third gear 904C meshed with first gear 904A and second gear 904B of first L-MLAG 902A (e.g., as shown in FIGS. 9A and 9B).

Second L-MLAG 902B may include a second support 903B. Second L-MLAG 902B may include a first gear 906A, a second gear 906B. First gear 906A and second gear 906B of second L-MLAG 902B may be interconnected to transmit rotational motion between each other. In some embodiments, second L-MLAG 902A includes a third gear 906C meshed with first gear 906A and second gear 906B of second L-MLAG 902B (e.g., as shown in FIGS. 9A and 9B).

In some embodiments, gears 904A-904C of first L-MLAG 902A rotate in one plane (e.g., a plane 901A shown in FIG. 9B), and gears 906A-906C of second L-MLAG 902B rotate in a different plane (e.g., a plane 901B shown in FIG. 9B) that is substantially parallel to the plane of first L-MLAG 902A (e.g., as shown in FIG. 9B). In some embodiments, second gear 904B of first L-MLAG 902A shares a common rotation axis 908 with first gear 906A of second L-MLAG 902B. In some embodiments, second gear 904B of first L-MLAG 902A and first gear 906A of second L-MLAG 902B rotate together. For example, MLAG 900 may include a shaft 909 that connects second gear 904B of first L-MLAG 902A and first gear 906A of second L-MLAG 902B such that gears 904B, 906A, and shaft 909 may rotate together about rotation axis 908 (e.g., as shown in FIG. 9B).

In some embodiments, shared common rotation axis 908 is also the axis of rotation of first L-MLAG 902A with respect to second L-MLAG 902B (e.g., as shown in FIGS. 9A and 9B).

Since gears 904A-904C of first L-MLAG 902A and gears 906A-906C of second L-MLAG 902B rotate together, when, for example, gear 904A is powered (turned or rotated) it causes gears 904B-904C of first L-MLAG 902A and 906A-906C of second L-MLAG 902B to rotate with it, each about its respective axis, while respective L-MLAGs 902A, 902B may remain stationary or move independently. Since first and second L-MLAGs 902A, 902B are connected via a common axis 908, their relative angle 910 may be changed by rotating either of the L-MLAGs 902A, 902B about axis 908. As shown in FIG. 9A, axis 908 may allow gears 904B, 906A to rotate independently of the rotation of either L-MLAG 902A or 902B about axis 908. Accordingly, rotational power may be provided to, for example, first gear 904A of first L-MLAG 902A (e.g., referred also as input gear 904A) and may be continuously transferred to gear 906B of second L-MLAG 902B (e.g., referred also as output gear 906B), and the relative angle between L-MLAG 902A and L-MLAG 902B may change independently of the rotation of the gears. As a result, rotational power may be transferred from input gear 904A to output gear 904C while the distance between their axes may be changed, by changing the relative angle between L-MLAGs 902A and 902B, independently of the rotation of the gears. In some embodiments, the way one L-MLAG may be rotated about a common axis with respect to a neighbor L-MLAG applies also to the way it may rotate about an axis connected to a reference frame, with respect to the reference frame.

Figure 10A:
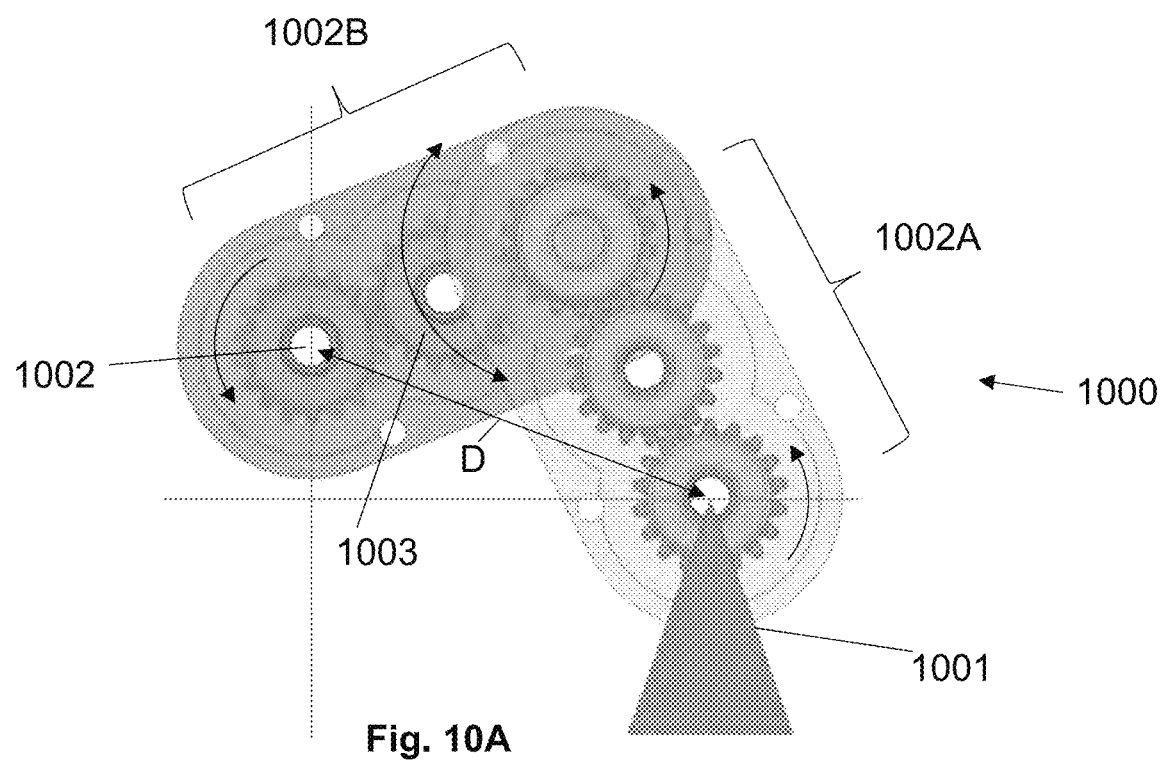
FIGS. 10A and 10B schematically show a side view and an isometric view, respectively, of a multi-link articulated gearbox (MLAG), according to some embodiments of the present invention.
Figure 10B:
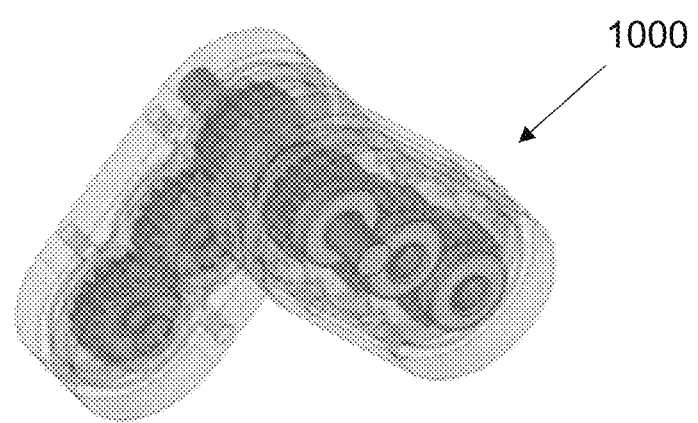

Reference is now made to FIGS. 10A and 10B, which schematically show a side view and an isometric view, respectively, of a multi-link articulated gearbox (MLAG) 1000, according to some embodiments of the present invention.

MLAG 1000 depicts two L-MLAGs 1002A, 1002B positioned in different planes that are parallel (or substantially parallel) to each other. When MLAG 1000 is connected at one end to a static point 1001, the other end 1002 may move so as to change a distance D between end 1002 and point 1001 as depicted by angular arrow 1003. In some embodiments, the output gear of MLAG 1000 may be in a different plane than that of the input gear of MLAG 1000.

Figure 11:
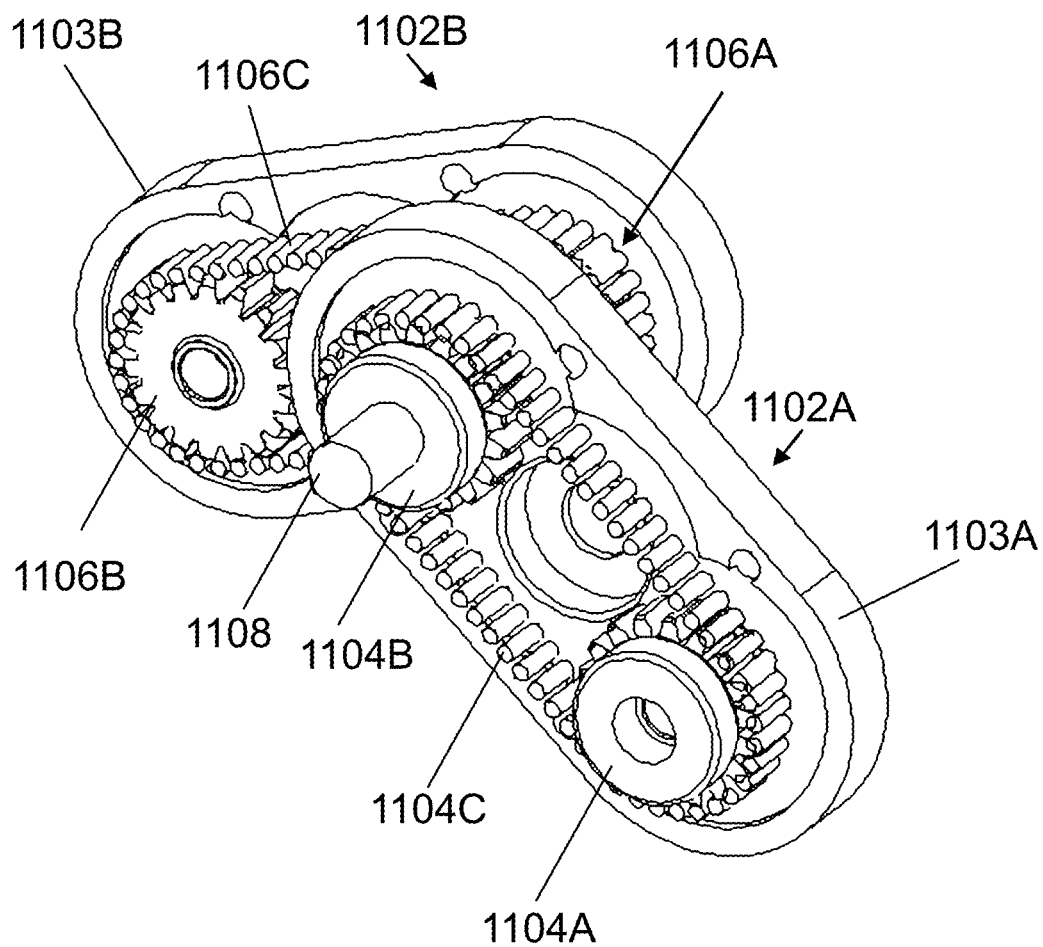
FIG. 11 is a schematic illustration of a multi-link articulated gearbox (MLAG) including chain gears and drive chains, according to some embodiments of the present invention.

Reference is now made to FIG. 11, which is a schematic illustration of a multi-link articulated gearbox (MLAG) 1100 including chain gears and drive chains, according to some embodiments of the present invention.

According to some embodiments of the invention, MLAG 1100 includes a first L-MLAG 1102A and second L-MLAG 1102B.

First L-MLAG 1102A may include a first support 1103A. First L-MLAG 1102A may include a first chain gear 1104A (e.g., first chain wheel 1104A), a second chain gear 1104B (e.g., a second chain wheel 1104B). First gear 1104A and second gear 1104B of first L-MLAG 1102A may be interconnected to transmit rotational motion between each other. In some embodiments, first L-MLAG 1102A includes a drive chain 1104C interconnecting first gear 1104A and second gear 1104B of first L-MLAG 1102A (e.g., as shown in FIG. 11).

Second L-MLAG 1102B may include a second support 1103B. Second L-MLAG 1102B may include a first chain gear 1106A (e.g., first chain wheel 1106A), a second belt gear 1106B (e.g., second belt wheel 1106B). First gear 1106A and second gear 1106B of second L-MLAG 1102B may be interconnected to transmit rotational motion between each other. In some embodiments, second L-MLAG 1102A includes a drive chain 1106C interconnecting first gear 1106A and second gear 1106B of second L-MLAG 1102B (e.g., as shown in FIG. 11).

Figure 12:
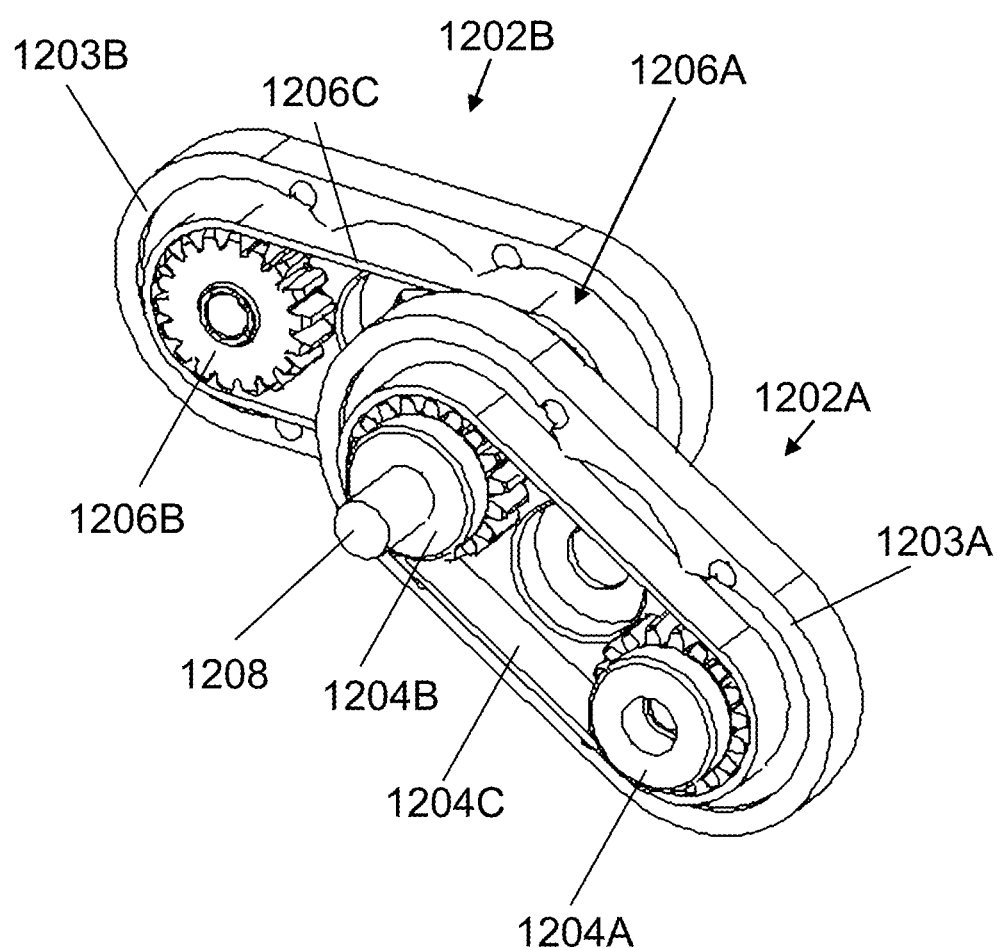
FIG. 12 is a schematic illustration of a multi-link articulated gearbox (MLAG) including belt gears and drive belts, according to some embodiments of the present invention.

Reference is now made to FIG. 12, which is a schematic illustration of a multi-link articulated gearbox (MLAG) 1200 including belt gears and drive belts, according to some embodiments of the present invention.

According to some embodiments of the invention, MLAG 1200 includes a first L-MLAG 1202A and second L-MLAG 1202B.

First L-MLAG 1202A may include a first support 1203A. First L-MLAG 1202A may include a first belt gear 1204A (e.g., first belt wheel 1204A), a second belt gear 1204B (e.g., a second belt wheel 1204B). First gear 1204A and second gear 1204B of first L-MLAG 1202A may be interconnected to transmit rotational motion between each other. In some embodiments, first L-MLAG 1202A includes a drive belt 1204C interconnecting first gear 1204A and second gear 1204B of first L-MLAG 1202A (e.g., as shown in FIG. 12).

Second L-MLAG 1202B may include a second support 1203B. Second L-MLAG 1202B may include a first belt gear 1206A (e.g., first belt wheel 1206A), a second belt gear 1206B (e.g., second belt wheel 1206B). First gear 1206A and second gear 1206B of second L-MLAG 1202B may be interconnected to transmit rotational motion between each other. In some embodiments, second L-MLAG 1202A includes a drive belt 1206C interconnecting first gear 1206A and second gear 1206B of second L-MLAG 1202B (e.g., as shown in FIG. 12).

It is noted that combinations of different L-MLAG configurations within the same MLAG are possible. For example, a first L-MLAG in a MLAG may include meshed gears (e.g., as described above with respect to FIGS. 9A and 9B), and a second L-MLAG in the MLAG may include chain gears interconnected by a drive chain (e.g., as described above with respect to FIG. 11). In another example, a first L-MLAG in a MLAG may include meshed gears (e.g., as described above with respect to FIGS. 9A and 9B), and a second L-MLAG in the MLAG may include belt gears interconnected by a drive belt (e.g., as described above with respect to FIG. 12). In another example, a first L-MLAG in a MLAG may include meshed gears chain gears interconnected by a drive chain (e.g., as described above with respect to FIG. 11), and a second L-MLAG in the MLAG may include belt gears interconnected by a drive belt (e.g., as described above with respect to FIG. 12).

According to some embodiments of the invention that were described above, the following are features that may be realized using a multi-link articulated gearbox (MLAG) of the invention:

Allowing steep angle of motion between input and output, i.e., large movement in one direction while keeping a slim or wide profile on other directions, to save volume occupied or bridge gaps, e.g., if the slim profile allows large travel and free low-resistance movement along the plane perpendicular to rotating shafts while minimizing distance in the direction of the shaft.

Enabling easy and simple integration of a clutch mechanism.

Enabling easy and simple integration of rotational speed reduction/increasing gear(s).

Supporting transfer of high torque, high rotational speeds and high power, efficiently.

Providing simple and free-standing system that does not require control or complicated subsystems (electronics, oil pump or other control apparatus) enabling transference of the power in a reliable manner.

Supporting two-way (forward and backward) power transfer through the system.

In some embodiments, a transmission gear constructed and operating according to the description above may be used, for example, for providing simple and reliable driving system for wheels traveling along bumpy road, by providing, by means of a multi-link articulated gearbox (MLAG) of the invention, rotational power to an input axis that is static with respect to the traveling vehicle and transferring the rotational power to a wheel following the bumpy road (and therefore dynamic with respect to the travelling vehicle).

Figure 13:
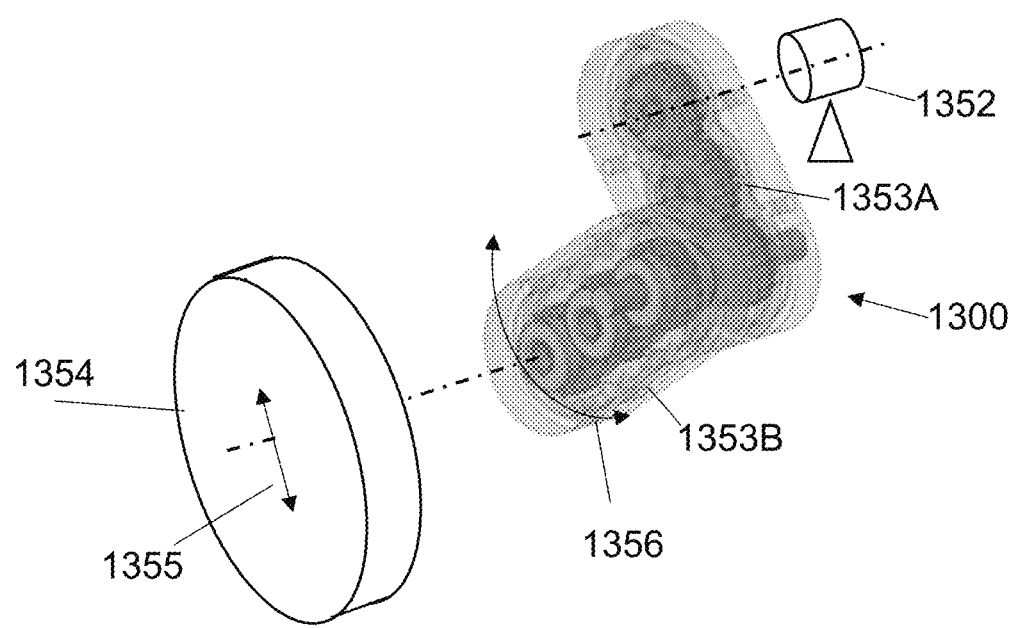
FIG. 13 depicts exemplary use of a multi-link articulated gearbox (MLAG) of FIGS. 9A and 9B, according to an embodiment of the present invention.

Reference is now made to FIG. 13, which depicts exemplary use of a multi-link articulated gearbox (MLAG) of FIGS. 9A and 9B, according to an embodiment of the present invention.

FIG. 13 depicts MLAG 1300 that is similar to MLAG 900 described above with respect to FIGS. 9A and 9B.

MLAG 1300 may be used to provide rotational power from a rotational source 1352 (e.g., a motor) via a first L-MLAG 1353A and a second L-MLAG 1353B to a wheel 1354. The freedom of second L-MLAG 1353B to move as indicated by arrow 1356, while the rotational source 1352 is static with respect to a reference frame (e.g., a vehicle's chassis), allows wheel 1354 to move as indicated by arrow 1355, for example when following bumps on a road.

Figure 14A:
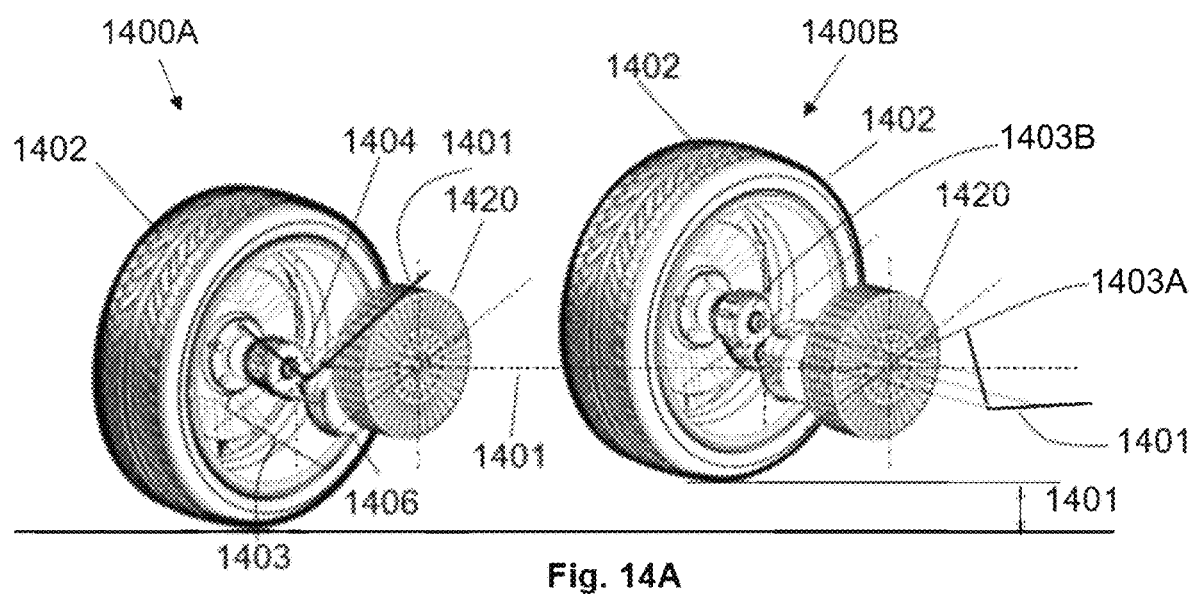
FIGS. 14A and 14B are schematic illustrations of an in-wheel multi-link transmission units (MLTU), according to some embodiments of the present invention.
Figure 14B:
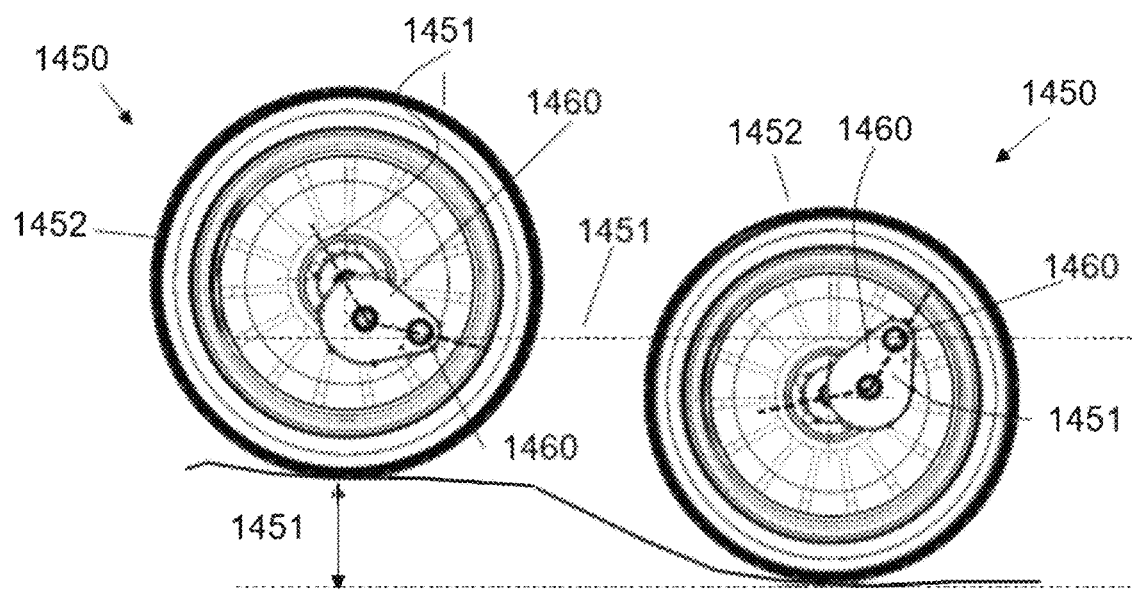

Reference is now made to FIGS. 14A and 14B, which are schematic illustrations of an in-wheel multi-link transmission units (MLTU) 1403 and 1460, respectively, according to some embodiments of the present invention.

MLTU 1403 in FIG. 14A may include two or more transmission links, that can transfer rotational power from a power input 1403A to a power output 1403B. Power input 1403A may be a motor, a gear or the like. Power output 1403B may be connected to a wheel and can drive (e.g., rotate) the wheel. MLTU 1403 may provide flexibility and freedom of movement between the power input 1403A and the wheel. In some embodiments, MLTU 1403 may be included, partially or fully, within the wheel rim, thereby enabling efficient occupation of an installation space. FIG. 14A illustrates wheel 1402 in two positions: a lower position 1400A on the left side and at a higher position 1400B on the right side. The vertical displacement of wheel 1402, 1401B, exemplifies the vertical freedom of movement of wheel 1402, while power input 1403A remains at the same level 1401A. FIG. 14B depicts MLTU 1460, that similarly to MLTU 1403, provides freedom of movement of wheel 1452, powered by MLTU 1460. Rotational power is provided at 1460A. Wheel 1452 is shown in its higher position 1450A on the left side and in its lower position 1450B on the right side. The vertical displacement of wheel 1452, 1451B is enabled due to freedom of movement between power input 1460A and the axis of wheel 1452. As depicted in FIG. 14B, power input 1460A remains at the same level 1451A when wheel 1452 moves vertically. In some embodiments, MLTU 1403 or 1460 may be embodied similarly, for example, to MLAG 900, MLAG 1100 or MLAG 1200 of FIGS. 9A-9B, 11, 12, respectively, or combinations of MLAG 900, MLAG 1100 or MLAG 1200.

Transmission gears of the types that are described above may respond to torque/moment that is transferred through them by developing counter torque acting around the power input axis. It can be desired to restrain and/or eliminate such counter torques because, for example, unrestrained torques can affect dynamic behavior of a wheel. For example, unrestrained torques may cause reduced or increased traction of the wheel with the road. This may, for example, affect operation of a brake system and/or a steering system of the wheel. In another example, when a transmission gear has two or more gear wheels arranged as described above and has the output shaft remote from the input shaft, the entire gearbox can rotate about the input shaft when rotational power is transferred through the gearbox in a rotational direction opposite to the rotational direction of the input power. This may cause a reduced or increased traction of the wheel with the road.

In the description below, $T_{in}$ is input torque to a transmission box at an input shaft (e.g., a shaft of an input gear), and $T_{react-out}$ is a reaction torque at a last gear of the transmission box, and $T_{fixture}$ is a torque at a point of fixture of the transmission box to a reference system (e.g., the ground or a vehicle chassis). According to Newton's laws of motion, conducting a summation of moments about a point in the system (the system can be defined as the transmission box as a whole) can result in a total of zero ($\Sigma M=0$) to reduce counter torques on the transmission box. The description below provides an example of torque calculations for a transmission having an odd number of gears with a transmission ratio of 1:n:

Defining $T_{in}$ is CCW, for odd number of gears, $T_{react-out}$ will be CW.

Because the transmission ratio is 1:n, $|T_{in}|=n \cdot T_{react-out}|$

When summing moments around the fixture, one gets:

$$\Sigma M = T_{in} - T_{react-out} + T_{fixture} = 0$$

Figure 15A:
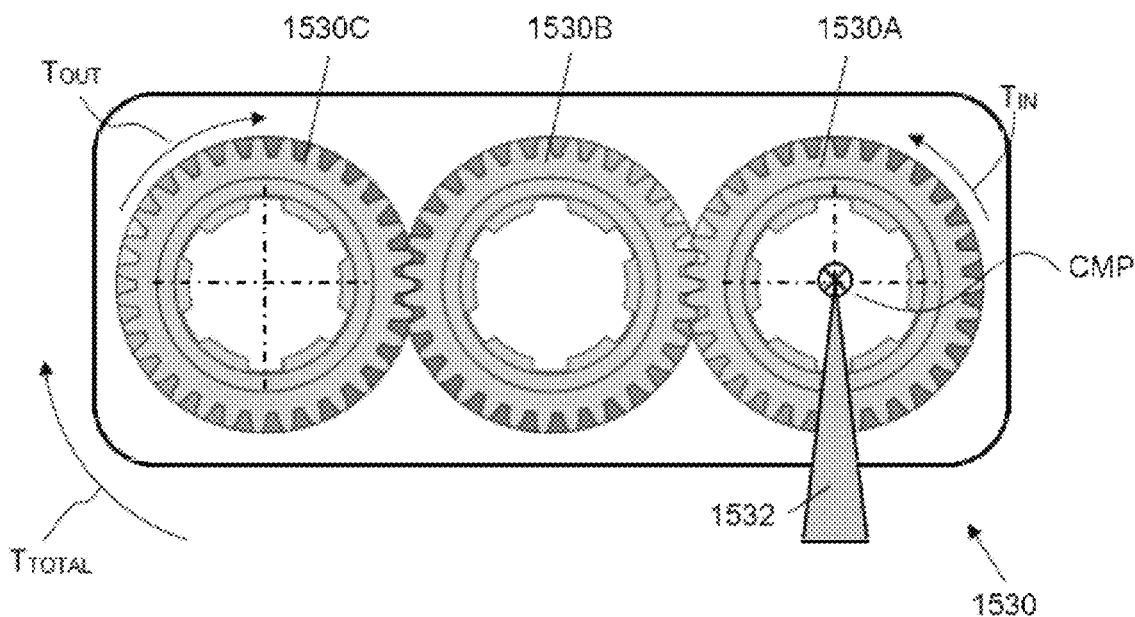
FIG. 15A is a schematic illustration of a Multi-gear-wheel transmission (MGWT), according to some embodiments of the present invention.

Further developing, one can find that $T_{fixture}=(1-n)\cdot T_{in}$
For a case with 1:1 transmission ratio, $T_{fixture}=0$ Reference is made now to FIG. 15A, which is a schematic illustration of transmission box 1530, according to some embodiments of the present invention. Transmission box (TB) 1530 includes 3 gears, 1530A meshed with gears 1530B and gears 1530B meshed with gears 1530C. Transmission box (TB) 1530 may be pivotally attached to a reference frame via stationary point 1532. When torque $T_{IN}$ is provided to input gear wheel 1530A, output gear 1530C transfers torque $T_{OUT}$. The total torque $T_{TOTAL}$ that TB 1530 experiences may be presented as: $T_{TOTAL}=T_{IN}-T_{OUT}$. In some embodiments, when the transmission ratio is 1:1, $T_{IN}=T_{OUT}$, $T_{TOTAL}=0$. TB 1530, which includes three gear wheels in a row, can be adapted to transfer rotational power from an input gear wheel to the output gear while the transmission box itself can experience virtually no torque (or negligible torque) with respect to the reference frame.

In various embodiments, one or more vibration sensors are placed in predetermined locations in or on the outer face of the transmission, for sensing and transmitting signals reflecting vibrations of the transmission. The predetermined locations can be based on pre-acquired profiles of similar transmissions may assist in obtaining early warning of required maintenance operation. When one or more signals form the one or more vibration sensors represent vibration that go out of a range that is considered 'healthy operation' range, either exceeding magnitude, frequency and/or temperature, the sensor signals may be processed in order to deduce whether or not immediate or close maintenance is required.

In some embodiments, gears and transmissions as described above may further include a lubrication system, heat dissipation system, mechanical connection(s) and/or reinforcement means, as may be required and dictated by the specific intended use.

In various embodiments, one or more rotational speed control means, such as speed reduction/increasing gears, and/or multi-ratio gears are integrated with one or more MLTUs, to, for example, provide a rotational power transmission solution with a multi-speed with freedom of movement between input and output axes.

Transmission gears of the types that are described above may respond to torque/moment that is transferred through them by developing counter torque acting around the power input axis. There can be a need to restrain and/or eliminate such counter torques. For example, when a transmission gear has two or more gear wheels arranged as described above and has the output shaft remote from the input shaft, the entire gearbox can rotate about the input shaft when rotational power is transferred through the gearbox in a rotational direction opposite to the rotational direction of the input power. This may interfere with the desired way of operation of the powered device.

In some embodiments, MGWT 1530 includes three gear wheels 1530A, 1530B and 1530C. Torque may be provided to the shaft of gear 1530A and may be transferred out via the shaft of gear wheel 1530C. The torque from gear 1530A is transferred to gear 1530C via gear wheel 1530B. Torques that can be operative when rotational power is provided to the shaft of wheel 1530A are: $T_{IN}$ is the torque that gear 1530A provides to gear wheel 1530B; $T_{OUT}$ is the torque that gear wheel 1530B provides to the output shaft of MGWT 1630; and $T_{TOTAL}$ is the response torque of MGWT 1530 when it transfers torque from its input shaft to its output shaft. The magnitude of $T_{TOTAL}$ is the algebraic sum of $T_{IN}$ and $T_{OUT}$. As is evident, when torque is transferred through MGWT 1530 the following yields:

$T_{TOTAL}=T_{IN}-T_{OUT}=0$ when $T_{IN}=T_{OUT}$, e.g., for transmission ratio of 1:1.

Figure 15B:
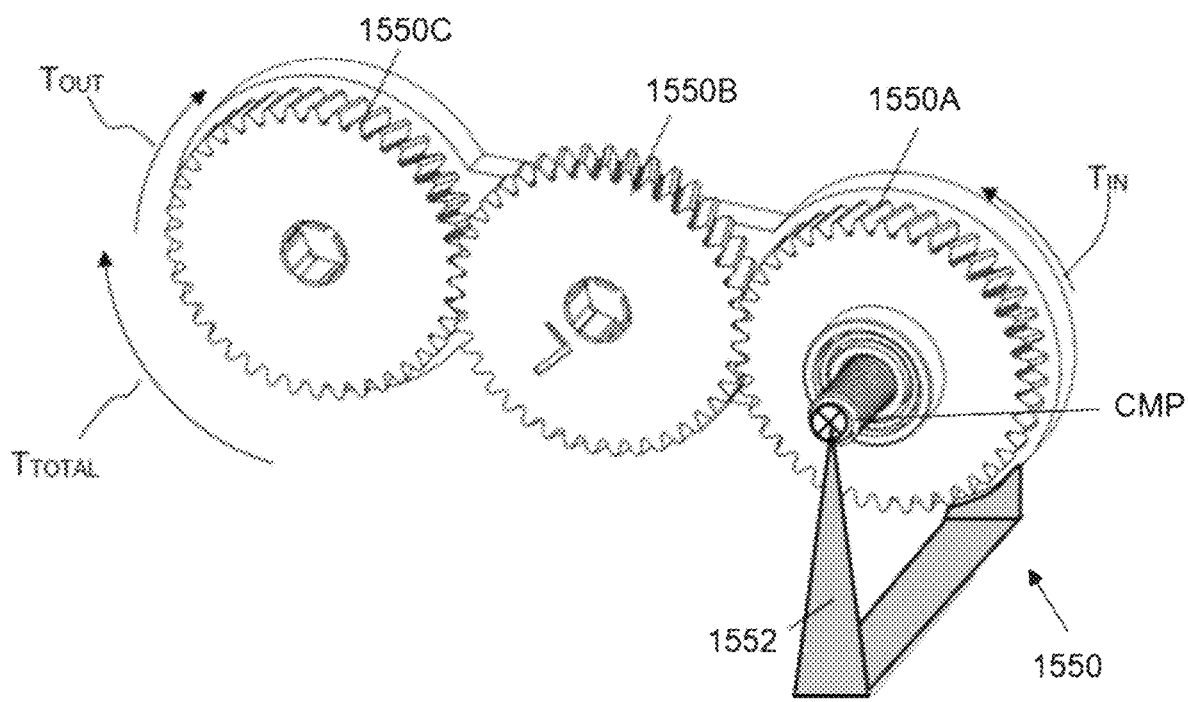
FIG. 15B is a schematic isometric view of a MGWT, according to some embodiments of the present invention.

Reference is now made to FIG. 15B, which is a schematic illustration of a Multi-gear-wheel transmission (MGWT) 1550, according to some embodiments of the present invention. MGWT 1550 includes three gear wheels 1550A, 1530B and 1550C. Torque may be provided to the shaft of gear wheel 1550A and may be transferred out via the shaft of gear wheel 1550C. The torque from gear wheel 1550A is transferred to gear wheel 1550C via gear wheel 1550B. The torque calculation of MGWT 1550 here applies:

$T_{TOTAL}=T_{IN}-T_{OUT}=0$ when $T_{IN}=T_{OUT}$, e.g., for transmission ratio of 1:1.

Figure 15C:
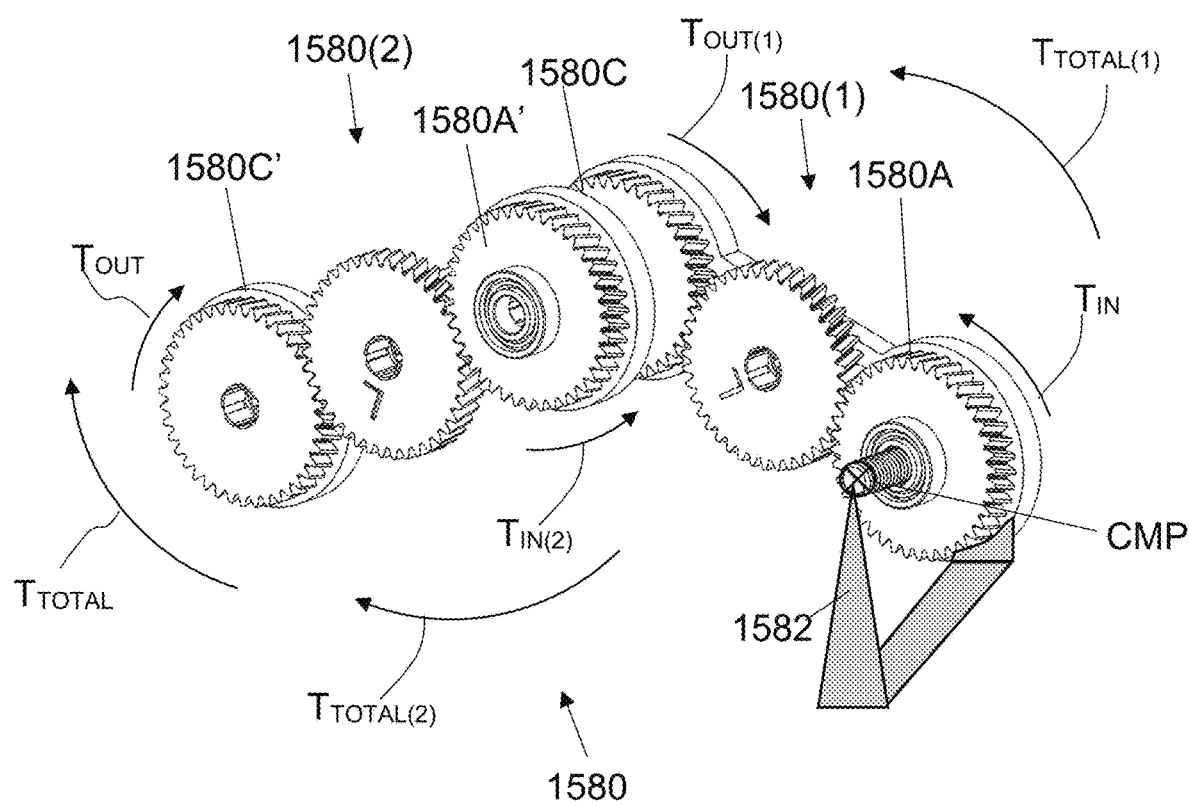
FIG. 15C is a schematic illustration of a two-links multi-gear-wheel transmission (MGWT), according to some embodiments of the invention.

Reference is now made to FIG. 15C, which is a schematic illustration of a two-links multi-gear-wheel transmission (MGWT) 1580, according to some embodiments of the invention. FIG. 15C shows an isometric view of two-links MGWT 1580.

MGWT 1580 may include a first part MGWT 1580(1) that may receive a torque $T_{IN}$ via a shaft of gear 1580A and transfer torque $T_{OUT(1)}$ via a shaft of gear 1580C. MGWT 1580 may include a second part MGWT 1580(2) that receives torque $T_{OUT(1)}$ from the shaft of gear 1580C, which is also the shaft of gear 1580A', the torque input $T_{IN(2)}$ to MGWT 1580(2). In some embodiments, the torques calculations can be as follows:

$T_{TOTAL(1)}=T_{IN}-T_{OUT(1)}=0$ when transmission ratio(1) is 1:1 within link 1580(1)

$T_{TOTAL(2)}=T_{IN(2)}-T_{OUT}=0$ when transmission ratio(2) is 1:1 within link 1580(2)

Hence:

$T_{TOTAL}=T_{TOTAL(1)}+T_{TOTAL(2)}=0$ when transmission ratios (1) and (2) are 1:1 which is a desired result.

Figure 16A:
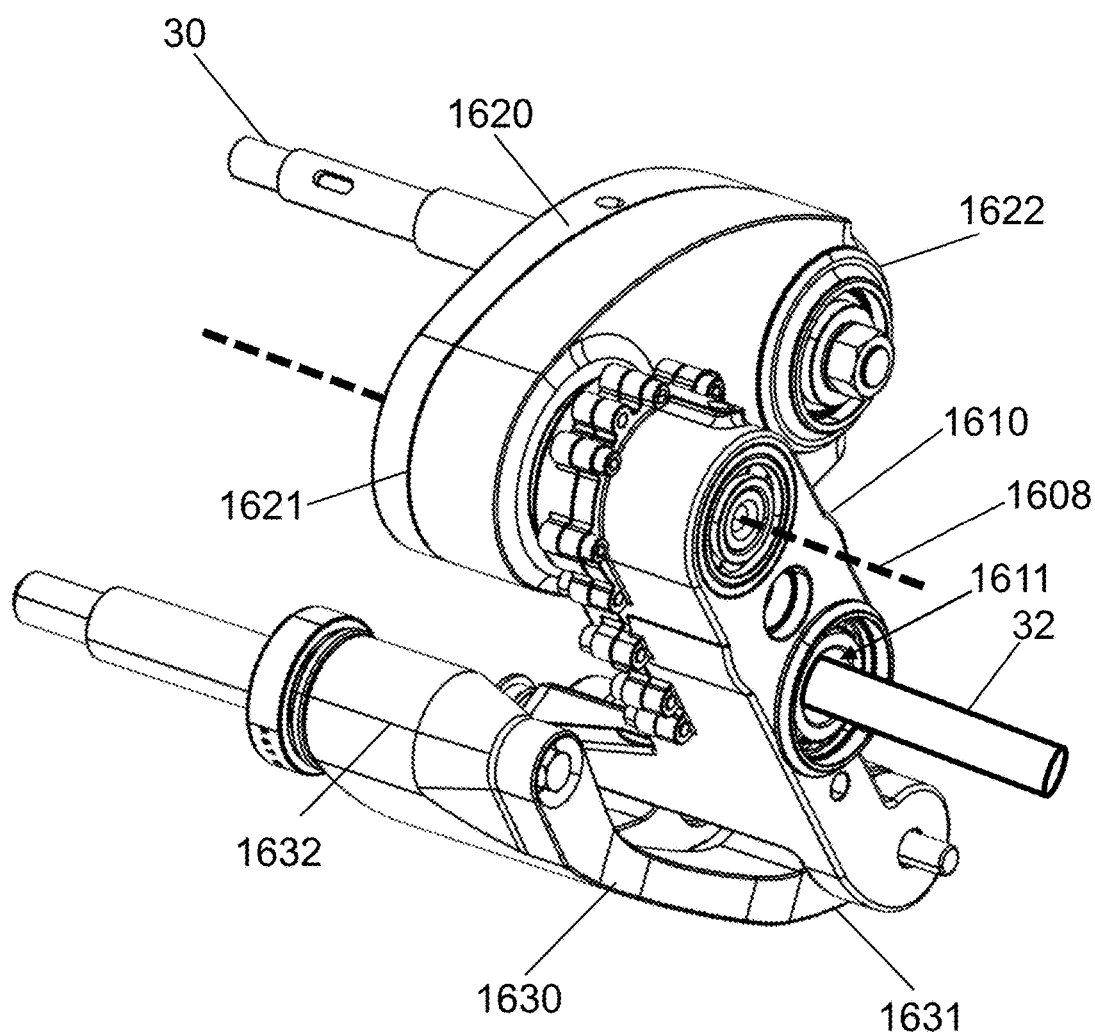
FIGS. 16A and 16B are schematic 3D diagrams of a wheel suspension and transmission gear assembly, according to some embodiments of the invention.
Figure 16B:
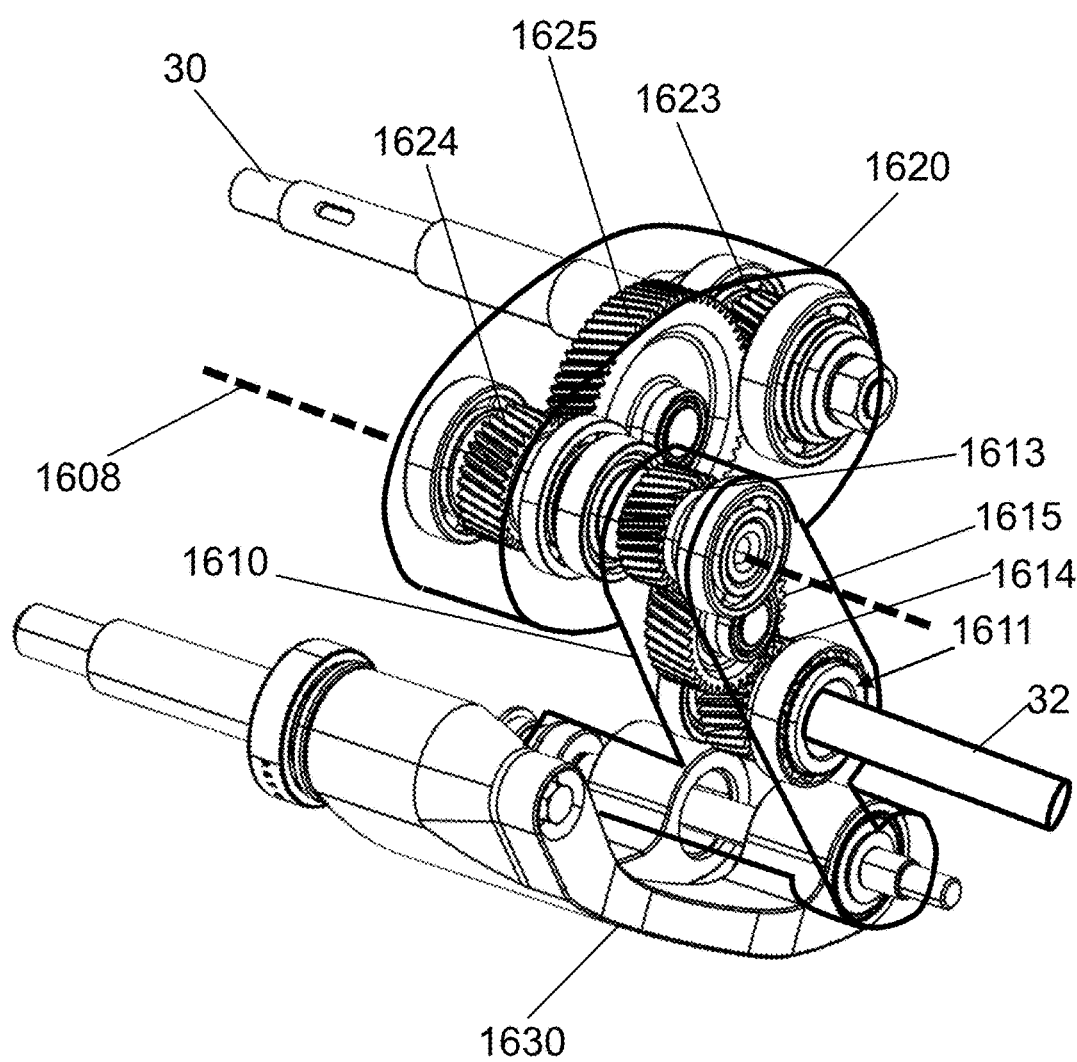

Reference is now made to FIGS. 16A and 16B, which are schematic 3D diagrams of a wheel suspension and transmission gear assembly 1600, according to some embodiments of the invention.

Figure 16C:
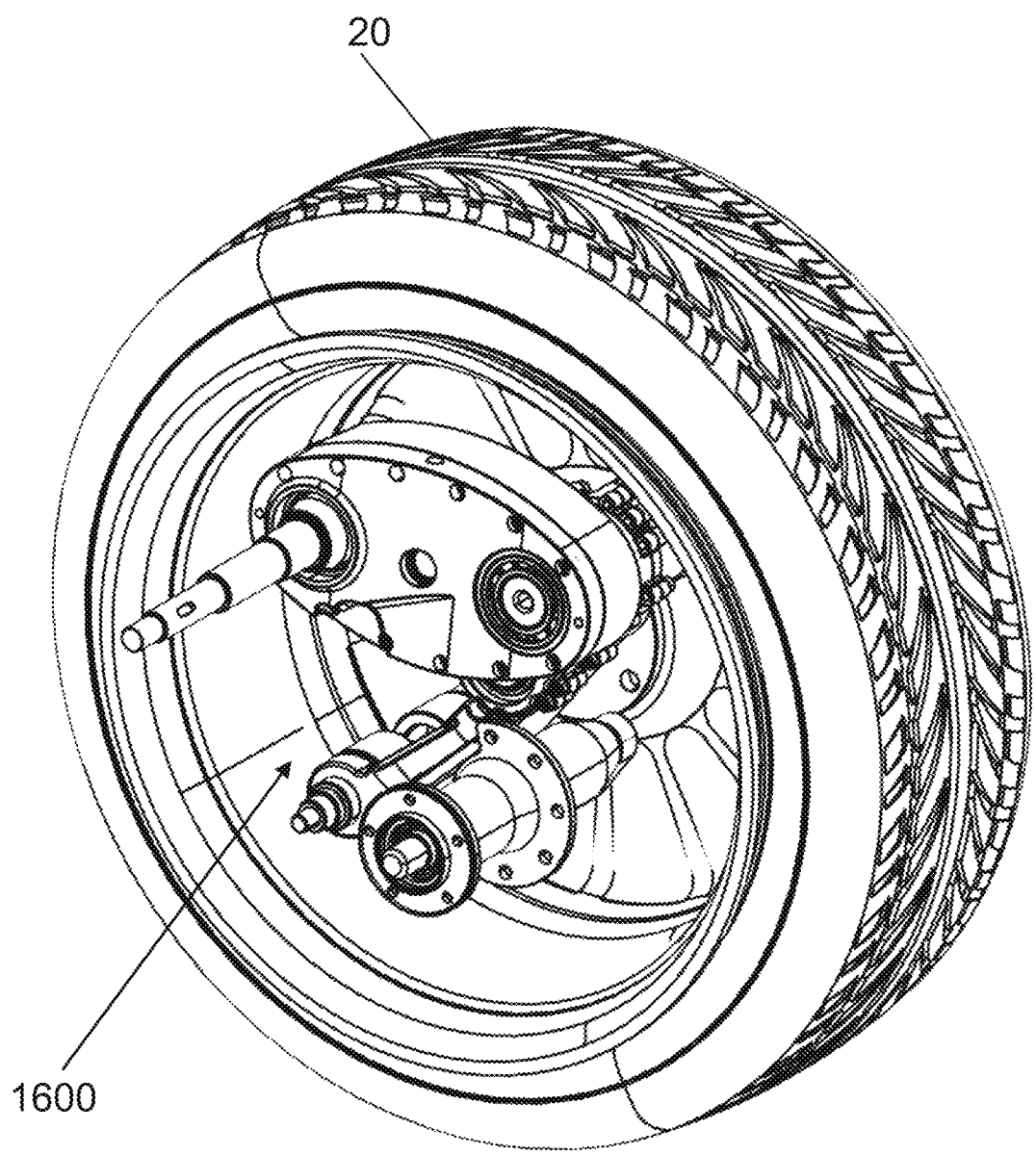
FIG. 16C is a schematic 3D diagrams of a wheel suspension and transmission gear assembly and a wheel assembled to wheel suspension and transmission gear assembly, according to some embodiments of the invention.

Reference is also made to FIG. 16C, which is a schematic 3D diagrams of a wheel suspension and transmission gear assembly 1600 and a wheel 20 assembled to wheel suspension and transmission gear assembly 1600, according to some embodiments of the invention.

According to some embodiments of the invention, wheel suspension and transmission gear assembly 1600 includes a main arm 1610, a first linkage unit 1620 and a second linkage unit 1630.

Main arm 1610 may be pivotally connectable at a connection point 1611 to a shaft point of a wheel. First linkage unit 1620 may be pivotally connected at its first end 1621 to main arm 1610.

Second linkage unit 1630 may be pivotally connected at its first end 1631 to main arm 1610. In some embodiments, second linkage unit 1630 is pivotally connected at its first end 1631 to main arm 1610 such that at least a portion of main arm 1610 is between first linkage unit 1620 the second linkage unit 1630. In some embodiments, second linkage unit 1630 is pivotally connected at its first end 1631 to main arm 1610 such that a second end 1622 of first linkage unit 1620 and a second end 1632 of second linkage unit 1630 are at opposing sides of main arm 1610 with respect to each other. In some embodiments, second linkage unit 1630 is pivotally connected at its first end 1631 to main arm 1610 such that main arm 1610, first linkage unit 1620 and second linkage unit 1630 form a substantially "Z" shape.

In some embodiments, second end 1622 of first linkage unit 1620 is pivotally connectable to the reference frame (e.g., the vehicle chassis). In some embodiments, second end 1632 of second linkage unit 1630 is pivotally connectable to the reference frame (e.g., the vehicle chassis).

In some embodiments, main arm 1610, first linkage unit 1620 and second linkage unit 1630 are rotatable in planes that are parallel (or substantially parallel) to a plane in which a wheel rotates when the wheel is assembled to wheel suspension and transmission gear assembly 1600.

In some embodiments, connection point 1611 of main arm 1610 to the shaft point of the wheel moves along a straight line in response to a change in a position of at least one of: main arm 1610, first linkage unit 1620 and second linkage unit 1630 (e.g., as described hereinabove).

In some embodiments, first linkage unit 1620 and second linkage unit 1630 are accommodated within a rim of the wheel when the wheel is assembled to wheel suspension and transmission gear assembly 1600 (e.g., as shown in FIG. 16C). In some embodiments, first linkage unit 1620 and second linkage unit 1630 are fully accommodated within a rim of the wheel when the wheel is assembled to wheel suspension and transmission gear assembly 1600.

In some embodiments, main arm 1610 includes a first gear 1613 and a second gear 1614 pivotally connected to main arm 1610 and interconnected to transmit rotational motion between each other (e.g., as shown in FIG. 16B). For example, gears 1613, 1614 of main arm 1610 may be positioned within main arm 1610. Main arm 1610 is shown as transparent in FIG. 16B for sake of clarity. In some embodiments, one of first linkage unit 1620 and second linkage unit 1630 includes a first gear and a second gear pivotally connected thereto and interconnected to transmit rotational motion between each other. For example, first linkage unit 1620 includes a first gear 1623 and a second gear 1624 connected to first linkage unit 1620 and interconnected to transmit rotational motion between each other (e.g., as shown in FIG. 16B). For example, gears 1623, 1624 of first linkage unit 1620 may be positioned within first linkage unit 1620 (e.g., as shown in FIG. 16B). Main arm 1610 is shown as transparent in FIG. 16B for sake of clarity. For simplicity, only first linkage unit 1620 is being described herein as having two or more gears. However, it is to be understood that in some embodiments second linkage unit 1630 (and not first linkage unit 1620) may include two or more gears pivotally connected thereto and interconnected to transmit rotational motion between each other.

In some embodiments, gears 1613, 1614 of main arm 1610 rotate in one plane, and gears 1623, 1624 of first linkage unit 1620 rotate in a different plane that is parallel (or substantially parallel) to the plane in which gears 1613, 1614 of main arm 1610 rotate (e.g., as shown in FIG. 16B). In some embodiments, gears 1613, 1614 of main arm 1610 and gears 1623, 1624 of first linkage unit 1620 are rotatable in planes that are parallel (or substantially parallel) to a plane in which a wheel rotates when the wheel is assembled to wheel suspension and transmission gear assembly 1600.

In some embodiments, first gear 1613 and second gear 1614 of main arm 1610 are rotatable in the same direction. In some embodiments, first gear 1623 and second gear 1624 of first linkage unit 1620 are rotatable in the same direction.

In some embodiments, main arm 1610 includes an odd number of meshed gears to transmit rotation of first gear 1613 of main arm 1610 to second gear 1614 of main arm 1610. For example, main arm 1610 may include a third gear 1615 meshed with first gear 1613 and second gear 1614 of main arm 1610 to transmit rotation of first gear 1613 of main arm 1610 to second gear 1614 of main arm 1610 (e.g., as shown in FIG. 16B).

In some embodiments, first linkage unit 1620 includes an odd number of meshed gears to transmit rotation of first gear 1623 of first linkage unit 1620 to second gear 1624 of first linkage unit 1620. For example, first linkage unit 1620 may include a third gear 1625 meshed with first gear 1623 and second gear 1624 of first linkage unit 1620 to transmit rotation of first gear 1623 of first linkage unit 1620 to second gear 1624 of first linkage unit 1620 (e.g., as shown in FIG. 16B).

In various embodiments, main arm 1610 includes a drive belt or a drive chain interconnecting first gear 1613 and second gear 1614 of main arm 1610 (e.g., instead of third gear 1615, for example as described above with respect to FIGS. 11 and 12). In various embodiments, first linkage unit 1620 includes a drive belt or a drive chain interconnecting first gear 1623 and second gear 1624 of first linkage unit 1620 (e.g., instead of third gear 1625, for example as described above with respect to FIGS. 11 and 12).

In some embodiments, first gear 1613 of main arm 1610 is rotatable by second gear 1624 of first linkage unit 1620. In some embodiments, second gear 1624 of first linkage unit 1620 and first gear 1613 of main arm 1610 rotate together about a common rotation axis 1608 (e.g., as shown in FIG. 16B). In some embodiments, common rotation axis 1608 is also the axis of rotation of first linkage unit 1620 with respect to main arm 1610 (e.g., as shown in FIG. 16B).

In some embodiments, first gear 1623 of first linkage unit 1620 is couplable to an input shaft 30 being powered by a rotational power source. In some embodiments, second gear 1614 of main arm 1610 is couplable to an output shaft 32 being coupled to the shaft point of the wheel (e.g., as shown in FIG. 16B).

Since (i) gears 1613, 1614 of main arm 1610 and (ii) gears 1623, 1624 of first linkage unit 1620 rotate together, when first gear 1623 of first linkage unit 1620 is powered via input shaft 10 it causes gear 1623-1625 and gears 1613-1615 to rotate with it, each about its respective axis, while each of main arm 1610 and first linkage unit 1620 may remain stationary or move independently. In this manner, rotations of input shaft 12 may be transmitted via the gears of first linkage unit 1620 and the gears of main arm 1610 to output shaft 12 and to the shaft point of the wheel without interfering (or substantially without interfering) with a suspension motion of main arm 1610 and first linkage unit 1620.

In some embodiments, wheel suspension and transmission gear assembly 1600 includes a shock absorbing unit (e.g., similar to shock absorbing unit 140 described above with respect to FIGS. 3A-3B). In some embodiments, the shock absorbing unit is connected to at least one of first linkage unit 1620 and second linkage unit 1630 to cause the shock absorbing unit to alter its length in response to a change in a position of at least one of: main arm 1610, first linkage unit 1620 and second linkage unit 1630 (e.g., as described above with respect to FIGS. 3A-3B).

Figure 16D:
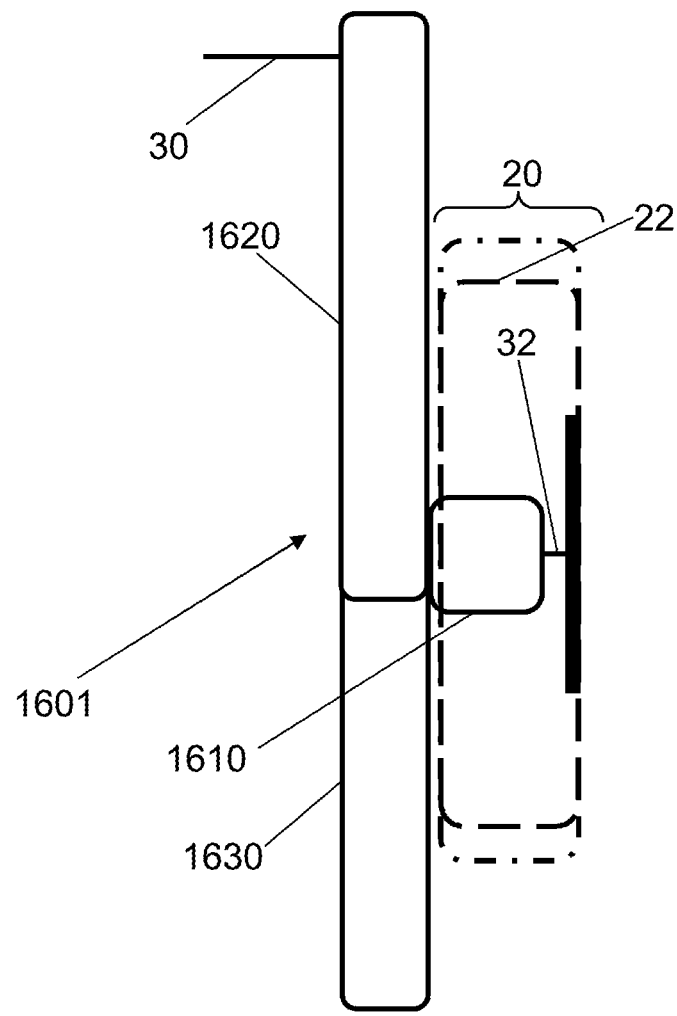
FIG. 16D is a schematic illustration and FIG. 16E is a schematic 3D diagram of a wheel suspension and transmission gear assembly and a wheel assembled to the wheel suspension and transmission gear assembly, according to some embodiments of the invention.
Figure 16E:
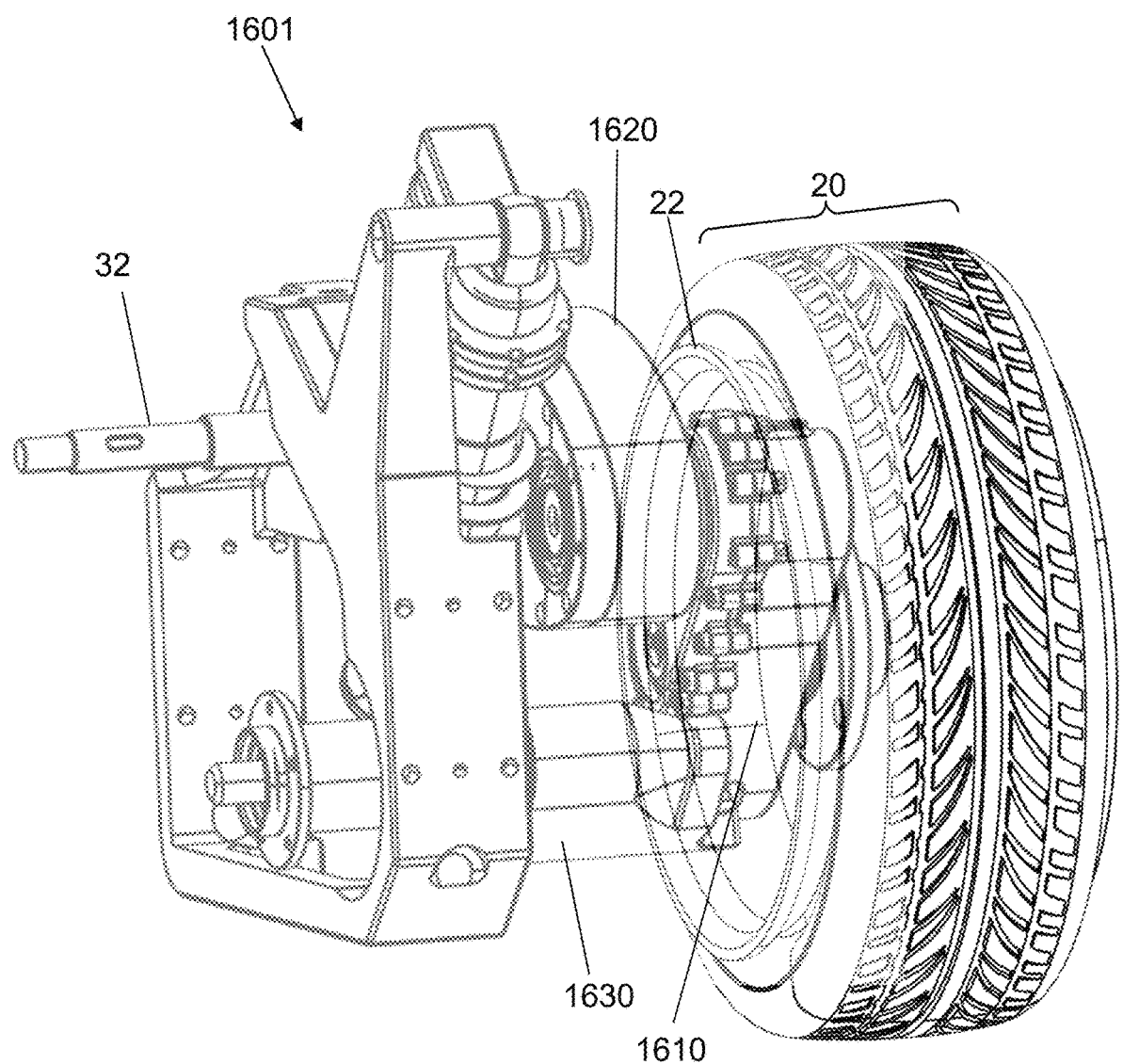

Reference is now made to FIG. 16D which is a schematic illustration and to FIG. 16E which is a schematic 3D diagram of a wheel suspension and transmission gear assembly 1601 and a wheel 20 assembled to wheel suspension and transmission gear assembly 1601, according to some embodiments of the invention.

In some embodiments, first linkage 1620 of wheel suspension and transmission gear assembly 1601 is positioned external to a rim 22 of wheel 20 when wheel 20 is assembled to wheel suspension and transmission gear assembly 1601 (e.g., as shown in FIGS. 16D and 16E). For example, first linkage 1620 may extend diametrically outside rim 22. For example, first linkage 1620 may laterally extend outside rim 22 toward the reference frame of the vehicle.

In some embodiments, second linkage 1630 of wheel suspension and transmission gear assembly 1601 is positioned external to rim 22 of wheel 20 when wheel 20 is assembled to wheel suspension and transmission gear assembly 1601 (e.g., as shown in FIGS. 16D and 16E). For example, second linkage 1630 may extend diametrically outside rim 22. For example, second linkage 1630 may laterally extend outside rim 22 toward the reference frame of the vehicle.

In some embodiments, both first linkage 1620 and second linkage 1630 of wheel suspension and transmission gear assembly 1601 are positioned external to rim 22 of wheel 20 when wheel 20 is assembled to wheel suspension and transmission gear assembly 1601.

Figure 17:
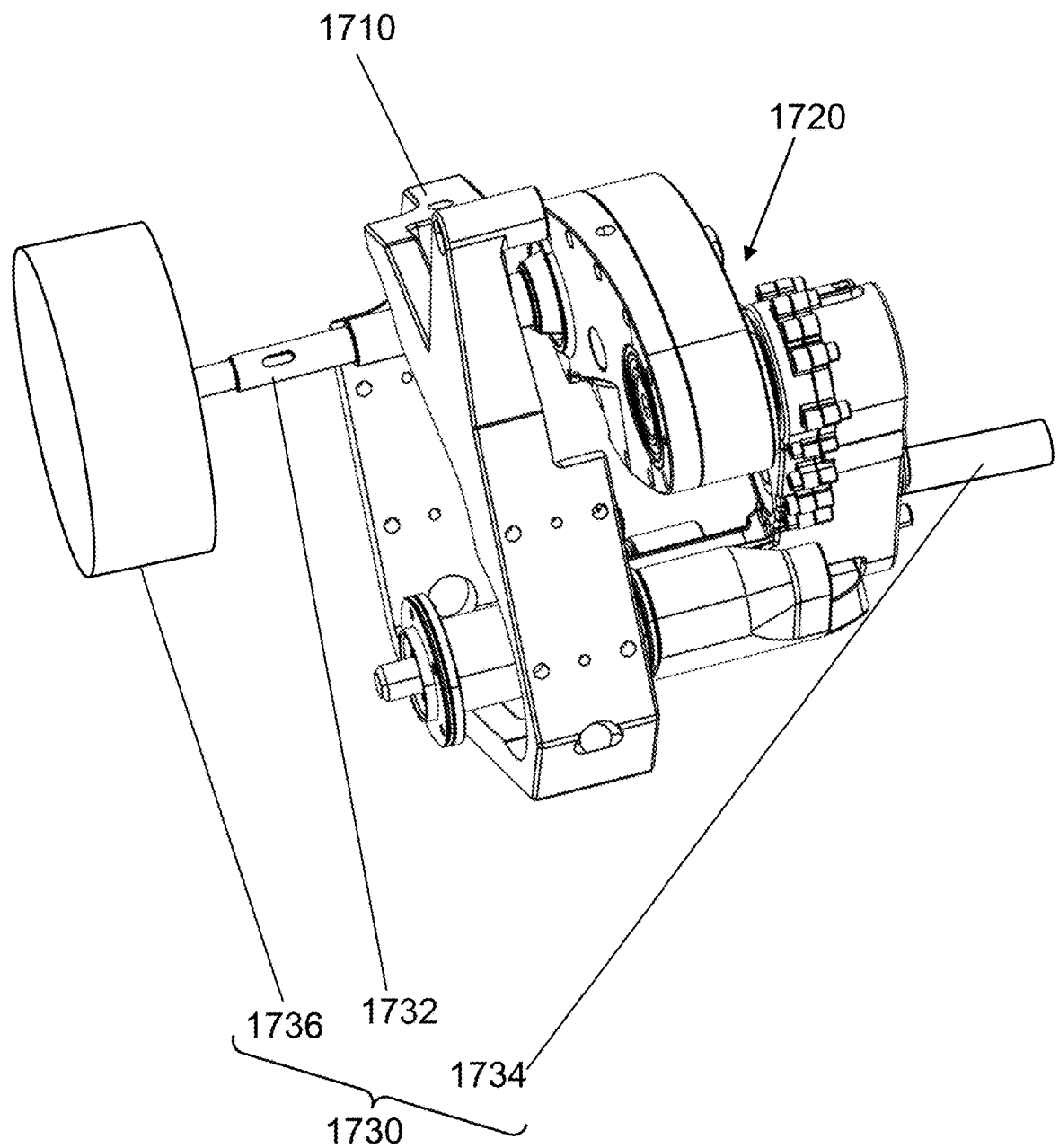
FIG. 17 is a schematic 3D diagram of a wheel corner module, according to some embodiments of the invention.

Reference is now made to FIG. 17, which a schematic 3D diagram of a wheel corner module 1700, according to some embodiments of the invention.

According to some embodiments of the invention, wheel corner module 1700 includes a sub-frame 1710, wheel suspension and transmission gear assembly 1720, and a drivetrain unit 1730.

Sub-frame 1710 may be a structural element that may connect at least some components of wheel corner module 1700 to a reference frame (e.g., vehicle's chassis).

Wheel suspension and transmission gear assembly 1720 may be, for example, similar to wheel suspension and transmission gear assembly 1600 described above with respect to FIGS. 16A-16B.

Drivetrain unit 1730 may include an input shaft 1732 coupled to a first gear of a first linkage unit of wheel suspension and transmission gear assembly 1720 (e.g., first gear 1623 of first linkage unit 1620 as described above with respect to FIGS. 16A-16B). Drivetrain unit 1730 may include an output shaft 1732 coupled to a second gear of a main arm of wheel suspension and transmission gear assembly 1720 (e.g., second gear 1614 of main arm 1610 as described above with respect to FIGS. 16A-16B) and couplable to a shaft point of a wheel (e.g., when the wheel is assembled to wheel corner module 1700). Drivetrain unit 1730 may include a rotational power source 1736 coupled to input shaft 1732.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A wheel suspension and transmission gear assembly, comprising:
    a main arm pivotally connectable at a connection point of the main arm to a shaft point of a wheel;
    a first linkage unit pivotally connected at its first end to the main arm; and
    a second linkage unit pivotally connected at its first end to the main arm such that at least a portion of the main arm is between the first linkage unit and the second linkage unit and such that a second end of the first linkage unit and a second end of the second linkage unit are at opposing sides of the main arm with respect to each other;
    wherein (i) the main arm and (ii) only the first linkage unit each comprises: a first gear and a second gear pivotally connected thereto and interconnected to transmit rotational motion between each other.

2. The assembly of claim 1, wherein:
    the first gear of the first linkage unit is couplable to an input shaft being powered by a rotational power source,
    the first gear of the main arm is rotatable by the second gear of the first linkage unit,
    the second gear of the main arm is couplable to an output shaft being coupled to the shaft point of the wheel; and
    the first gear of the first linkage unit is a first gear in the transmission gear assembly and the second gear of the main arm is a last gear in the transmission gear assembly.

3. The assembly of claim 2, wherein the second gear of the first linkage unit and the first gear of the main arm rotate together about a common axis.

4. The assembly of claim 1, wherein the gears of the main arm rotate in one plane, and the gears of the first linkage unit rotate in a different plane that is substantially parallel to the plane in which the gears of the main arm rotate.

5. The assembly of claim 1, wherein the first gear and the second gear of at least one of (i) the main arm and (ii) the first linkage unit, rotate in the same direction.

6. The assembly of claim 1, wherein at least one of (i) the main arm and (ii) the first linkage unit comprises a drive belt or a drive chain interconnecting the respective first gear and the second gear.

7. The assembly of claim 1, wherein at least one of (i) the main arm and (ii) the first linkage unit comprises an odd number of meshed gears to transmit rotation of the respective first gear to the respective second gear.

8. The assembly of claim 1, further comprising a shock absorbing unit.

9. The assembly of claim 8, wherein the shock absorbing unit is connected to at least one of the first linkage unit and the second linkage unit to cause the shock absorbing unit to alter its length in response to a change in a position of at least one of: the main arm, the first linkage unit and the second linkage unit.

10. The assembly of claim 1, wherein the connection point of the main arm to the shaft point moves along a straight line in response to a change in a position of at least one of: the main arm, the first linkage unit and the second linkage unit.

11. The assembly of claim 1, wherein:
    the second gear of the main arm and the first gear of the first linkage unit are rotatable in the same direction;
    the first gear of the first linkage unit is couplable to an input shaft being powered by a rotational power source,
    the first gear of the main arm is rotatable by the second gear of the first linkage unit, and
    the second gear of the main arm is couplable to an output shaft being coupled to the shaft point of the wheel.

12. The assembly of claim 1, wherein:
    the first gear of the first linkage unit is couplable to an input shaft being powered by a rotational power source,
    the first gear of the main arm is rotatable by the second gear of the first linkage unit, and the second gear of the main arm is couplable to an output shaft being coupled to the shaft point of the wheel, the second gear of the main arm being a last gear in the gears of the main arm.

13. A wheel corner module comprising:
a wheel suspension and transmission gear assembly, comprising:
   a main arm pivotally connectable at a connection point of the main arm to a shaft point of a wheel;
   a first linkage unit pivotally connected at its first end to the main arm; and
   a second linkage unit pivotally connected at its first end to the main arm such that at least a portion of the main arm is between the first linkage unit and the second linkage unit and such that a second end of the first linkage unit and a second end of the second linkage unit are at opposing sides of the main arm with respect to each other;
   wherein (i) the main arm and (ii) only the first linkage unit each comprises: a first gear and a second gear pivotally connected thereto and interconnected to transmit rotational motion between each other; and
a drivetrain unit comprising:
   an input shaft coupled to the first gear of the first linkage unit or the second linkage unit;
   an output shaft coupled to the second gear of the main arm and couplable to the shaft point of the wheel; and
   a rotational power source coupled to the input shaft.

14. The wheel corner module of claim 13, wherein the first gear of the main arm is rotatable by the second gear of the first linkage unit.

15. The wheel corner module of claim 14, wherein the second gear of the first linkage unit and the first gear of the main arm rotate together about a common axis.

16. The wheel corner module of claim 13, wherein the gears of the main arm rotate in one plane, and the gears of the first linkage unit rotate in a different plane that is substantially parallel to the plane in which the gears of the main arm rotate.

17. The wheel corner module gear of claim 13, wherein the first gear and the second gear of at least one of (i) the main arm and (ii) the first linkage unit, rotate in the same direction.

18. The wheel corner module of claim 13, wherein at least one of (i) the main arm and (ii) the first linkage unit comprises a drive belt or a drive chain interconnecting the respective first gear and the second gear.

19. The wheel corner module of claim 13, wherein at least one of (i) the main arm and (ii) the first linkage unit comprises an odd number of meshed gears to transmit rotation of the respective first gear to the respective second gear.

20. The wheel corner module of claim 13, further comprising a shock absorbing unit.

21. The wheel corner module of claim 13, wherein the shock absorbing unit is connected to at least one of the first linkage unit and the second linkage unit to cause the shock absorbing unit to alter its length in response to a change in a position of at least one of: the main arm, the first linkage unit and the second linkage unit.

22. The wheel corner module of claim 13, wherein the connection point of the main arm to the shaft point moves along a straight line in response to a change in a position of at least one of: the main arm, the first linkage unit and the second linkage unit.

23. The wheel corner module of claim 13, wherein the first gear of the first linkage unit is a first gear in the transmission gear assembly and the second gear of the main arm is a last gear in the transmission gear assembly.

24. The wheel corner module of claim 13, wherein the second gear of the main arm is a last gear in the gears of the main arm.

25. The wheel corner module of claim 13, wherein the output shaft and the input shaft are rotatable in the same direction.

* * * * *